US010299543B2

(12) United States Patent
Baucom et al.

(10) Patent No.: US 10,299,543 B2
(45) Date of Patent: May 28, 2019

(54) METHOD FOR MAKING A CLEATED PLATE

(71) Applicant: NIKE, Inc., Beaverton, OR (US)

(72) Inventors: Jim Baucom, Portland, OR (US); Clifford B. Gerber, Hillsboro, OR (US); Haim Horesh, Ho Chi Minh City (VN); Hector R. Quinonez, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/893,907

(22) Filed: Feb. 12, 2018

(65) Prior Publication Data

US 2018/0184763 A1    Jul. 5, 2018

Related U.S. Application Data

(60) Continuation of application No. 14/575,309, filed on Dec. 18, 2014, now Pat. No. 9,901,141, which is a
(Continued)

(51) Int. Cl.
    *B29C 45/14*      (2006.01)
    *A43C 15/16*      (2006.01)
(Continued)

(52) U.S. Cl.
    CPC ............... *A43C 15/16* (2013.01); *A43B 5/00* (2013.01); *A43C 15/02* (2013.01); *A43C 15/161* (2013.01);
(Continued)

(58) Field of Classification Search
None
See application file for complete search history.

(56) References Cited

U.S. PATENT DOCUMENTS

| 2,415,961 A | 2/1947 | Nast |
| 2,931,110 A | 4/1960 | Pietrocola |
| (Continued) | | |

FOREIGN PATENT DOCUMENTS

| EP | 1410727 A1 | 4/2004 |
| FR | 2571300 | * 4/1986 |
| (Continued) | | |

OTHER PUBLICATIONS

International Searching Authority, International Report on Patentability and Written Opinion for Application No. PCT/US2012/033719, dated Oct. 31, 2013.
(Continued)

*Primary Examiner* — Edmund H Lee
(74) *Attorney, Agent, or Firm* — Honigman LLP; Matthew H. Szalach; Jonathan P. O'Brien

(57) ABSTRACT

A method for making a cleated plate member for an article of footwear is described. The method includes a number of steps where various molds are used to form different components of the cleated plate member. A collar receptacle is formed using a first molding process. A cleat member is formed from a non-compatible material with a fastener of the cleat member associated with the collar receptacle using another molding process to form a combined cleat assembly. The combined cleat assembly is placed into corresponding receptacles in a mold used to form the cleated plate member. The cleated plate member is formed using another molding process that embeds the collar receptacle into the body of the cleated plate member. The completed cleated plate member includes releasably attached cleat members.

20 Claims, 23 Drawing Sheets

Related U.S. Application Data division of application No. 13/091,236, filed on Apr. 21, 2011, now Pat. No. 8,945,449.

(51) Int. Cl.

| | | |
|---|---|---|
| *B29C 45/16* | (2006.01) | |
| *B29D 35/00* | (2010.01) | |
| *B29D 35/12* | (2010.01) | |
| *B29D 35/14* | (2010.01) | |
| *B29C 45/26* | (2006.01) | |
| *A43B 5/00* | (2006.01) | |
| *A43C 15/02* | (2006.01) | |
| *B29K 75/00* | (2006.01) | |

(52) U.S. Cl.
CPC .. *B29C 45/14065* (2013.01); *B29C 45/14336* (2013.01); *B29C 45/1675* (2013.01); *B29C 45/2618* (2013.01); *B29D 35/0009* (2013.01); *B29D 35/12* (2013.01); *B29D 35/128* (2013.01); *B29D 35/14* (2013.01); *B29D 35/142* (2013.01); *B29D 35/148* (2013.01); *B29C 2045/1601* (2013.01); *B29K 2075/00* (2013.01)

(56) References Cited

U.S. PATENT DOCUMENTS

| | | | |
|---|---|---|---|
| 3,156,987 A * | 11/1964 | Dassler | A43C 15/165 36/114 |
| 3,492,744 A | 2/1970 | Bernier et al. | |
| 3,529,370 A | 9/1970 | Bernier et al. | |
| 3,537,193 A | 11/1970 | Bernier et al. | |
| 3,559,311 A | 2/1971 | Bernier et al. | |
| 3,577,503 A * | 5/1971 | Innocenti | A43C 15/161 12/142 RS |
| 3,587,181 A | 6/1971 | Bernier et al. | |
| 3,597,863 A | 8/1971 | Austin et al. | |
| 3,609,889 A * | 10/1971 | Calvin et al. | A43B 5/001 264/244 |
| 3,624,934 A | 12/1971 | Bernier et al. | |
| 3,626,611 A | 12/1971 | Bernier et al. | |
| 3,739,499 A | 6/1973 | Morin | |
| 3,876,176 A | 4/1975 | Morin | |
| 3,925,529 A | 12/1975 | Bernier et al. | |
| 3,928,881 A * | 12/1975 | Bente | A43B 13/26 12/142 R |
| 4,348,003 A | 9/1982 | Beneteau | |
| 4,445,289 A * | 5/1984 | Beneteau | A43D 999/00 36/134 |
| 4,787,156 A | 11/1988 | Bade | |
| 4,791,692 A | 12/1988 | Collins | |
| 4,984,320 A * | 1/1991 | Curley, Jr. | A43B 13/12 12/142 P |
| 5,000,637 A | 3/1991 | Adams | |
| 5,243,775 A * | 9/1993 | Swain | A43C 15/161 36/127 |
| 5,386,651 A * | 2/1995 | Okamoto | A43B 13/26 36/134 |
| 5,426,873 A | 6/1995 | Savoie | |
| 5,623,774 A | 4/1997 | Abbey | |
| 5,705,112 A | 1/1998 | Gram | |
| 5,932,336 A | 8/1999 | Allen et al. | |
| 5,960,568 A | 10/1999 | Bell et al. | |
| 6,032,388 A | 3/2000 | Fram | |
| 6,105,282 A * | 8/2000 | Wiand | A43C 15/16 36/134 |
| 6,129,880 A | 10/2000 | Kieras et al. | |
| 6,702,469 B1 | 3/2004 | Taniguchi et al. | |
| 7,070,725 B2 | 7/2006 | Mathew et al. | |
| 7,731,883 B2 | 6/2010 | Johnson et al. | |
| 8,206,630 B2 | 6/2012 | Sussmann et al. | |
| 9,833,958 B2 * | 12/2017 | Yang | B29D 35/142 |
| 2007/0278716 A1 | 12/2007 | Johnson et al. | |

FOREIGN PATENT DOCUMENTS

| | | |
|---|---|---|
| GB | 1314728 A | 4/1973 |
| GB | 1564930 A | 4/1980 |
| JP | 60145819 | 9/1985 |

OTHER PUBLICATIONS

International Searching Authority, International Search Report and Written Opinion for Application No. PCT/US2012/033719, dated Nov. 7, 2012.

\* cited by examiner

METHOD FOR MAKING A CLEATED PLATE

CROSS REFERENCE TO RELATED APPLICATION

This application is a continuation of U.S. patent application Ser. No. 14/575,309, filed Dec. 18, 2014, now U.S. Pat. No. 9,901,141, which claims priority to and is a divisional of U.S. Pat. No. 8,945,449, filed on Apr. 21, 2011 and entitled Method For Making a Cleated Plate, the entire contents of which are incorporated herein by reference in their entirety.

BACKGROUND

The present invention relates generally to articles of footwear, and in particular to a method for making a cleated plate for an article of footwear.

Savoie (U.S. Pat. No. 5,426,873) discloses a method in which a cleat assembly is molded into an outsole of a shoe. A spike member is inserted into a central aperture of a washer member. A thermoplastic material is then injection molded around the perimeter of the washer member to form the cleat assembly. The entire cleat assembly is then permanently molded into the sole.

Swain (U.S. Pat. No. 5,243,775) discloses a method in which an injection molded thermoplastic connection part is embedded in a sole of a shoe. The connection part includes a thread for receiving corresponding threads of a gripper body. The connection part also includes a metal bush with a milled thread around which the connection part is molded.

SUMMARY

In one aspect, the invention includes a method of making a cleated plate member for an article of footwear comprising the steps of: forming a collar receptacle having a hole using a first molding system; forming at least one cleat member having a fastener element using the collar receptacle and a second molding system to form a cleat assembly; placing the cleat assembly into at least one cleat assembly receptacle disposed in a plate cavity associated with a third molding system; and forming a cleated plate member having the collar receptacle embedded within a body of the cleated plate member using the third molding system.

In another aspect, the invention includes a method of making a cleated plate member for an article of footwear comprising the steps of: associating a plurality of cleat assemblies with a plurality of cleat assembly receptacles within a plate cavity of a molding base; placing a molding top over the molding base; injecting a molding material into at least the plate cavity of the molding base; wherein each of the plurality of cleat assemblies comprises a collar receptacle and a cleat member; wherein each of the plurality of cleat assembly receptacles within the plate cavity are configured to receive the cleat member of the cleat assembly; and wherein the molding material surrounds the collar receptacle of each cleat assembly within the plate cavity.

In another aspect, the invention includes a method of making a cleated plate member for an article of footwear comprising the steps of: forming a cleat assembly including a collar receptacle associated with a cleat member using a first molding system; placing the cleat assembly into at least one cleat assembly receptacle disposed in a plate cavity associated with a second molding system; forming a cleated plate member having the collar receptacle embedded within a body of the cleated plate member using the second molding system; and wherein the cleat member is releasably attached to the cleated plate member through the collar receptacle.

In another aspect, the invention includes a method of making a cleated plate member for an article of footwear comprising the steps of: forming a cleat assembly including a collar receptacle associated with a cleat member using a first molding system; placing the cleat assembly into at least one cleat assembly receptacle disposed in a plate cavity associated with a second molding system; forming a cleated plate member having the collar receptacle embedded within a body of the cleated plate member using the second molding system; and wherein the cleat member is releasably attached to the cleated plate member through the collar receptacle.

In another aspect, the invention includes a method of making a combined cleat assembly for a cleated plate member comprising the steps of: forming a collar receptacle using a first molding system; forming at least one cleat member having a fastener element using the collar receptacle and a second molding system to form a cleat assembly; wherein the at least one cleat member is formed by injecting molding material into the second molding system having the collar receptacle disposed within; wherein a fastener receiving portion of the collar receptacle forms the corresponding fastener element of the cleat member; and wherein the collar receptacle and the fastener element do not bond.

In another aspect, the invention includes a cleated plate member for an article of footwear, comprising: a plate body made of a first material; a plurality of cleat assemblies, each cleat assembly including a collar receptacle associated with a cleat member; wherein the first material surrounds a portion of the collar receptacle to embed the collar receptacle within the plate body of the cleated plate member; and wherein the cleat member is releasably attached to the cleated plate member through the collar receptacle.

In another aspect, the invention includes a combined cleat assembly for making a cleated plate member, comprising: a cleat member having a fastener element made of a first material; a collar receptacle disposed around the fastener element of the cleat member to form the combined cleat assembly, the collar receptacle made of a second material; wherein the cleat member is molded through a portion of the collar receptacle by injecting a second material into a molding system having the collar receptacle disposed within; wherein a fastener receiving portion of the collar receptacle forms the corresponding fastener element of the cleat member; and wherein the first material and the second material do not bond.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A method for making a cleated plate member is disclosed herein. In particular, the cleated plate member may be used as an outsole for an article of footwear. For purposes of illustration, the cleated plate member is shown in isolation in the current embodiments. In other embodiments, however, the cleated plate member could be associated with an upper for an article of footwear. It should be noted that the cleated plate member could take the form of an outsole or a sole structure for any article of footwear including, but not limited to: hiking boots, soccer shoes, football shoes, sneakers, rugby shoes, basketball shoes, baseball shoes, track shoes, as well as other kinds of shoes.

Figure 1:
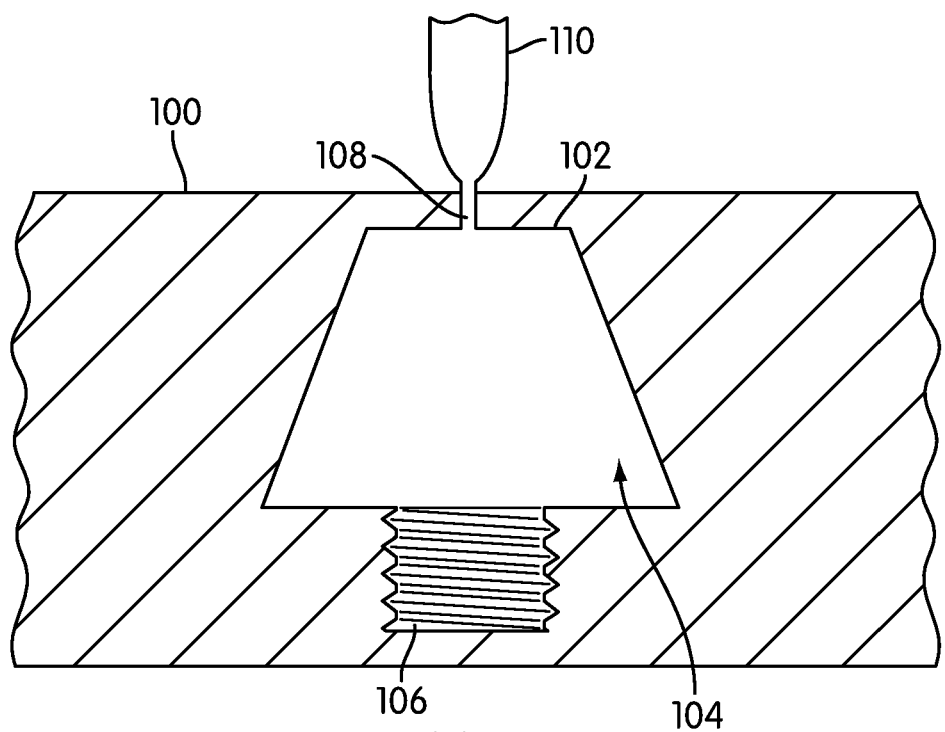
FIG. 1 is a schematic view of an exemplary embodiment of a molding system for a cleat member.

FIG. 1 is a schematic view of an exemplary embodiment of a molding system 100 that may be used to make a cleat member. In some embodiments, molding system 100 may be an injection mold. Molding system 100 may include one or more components typically associated with an injection mold, including components not described herein. In an exemplary embodiment, molding system 100 may include a mold cavity 102. In some embodiments, mold cavity 102 may be sized and dimensioned so as to correspond to a shape associated with a cleat member. Generally, the term "cleat member" as used in this detailed description and throughout the claims includes any provision disposed on an outsole for increasing traction through friction or penetration of a ground surface. Molding system 100 may be configured to make a cleat member of any type, shape, or configuration.

In some embodiments, mold cavity 102 may include one or more portions configured to correspond to different portions of a cleat member. In an exemplary embodiment, mold cavity 102 may include a body cavity portion 104. In an exemplary embodiment, body cavity portion 104 may correspond to a body of a cleat member. In an exemplary embodiment, body cavity portion 104 may correspond to a substantially conical shaped cleat member body. In other embodiments, body cavity portion 104 may correspond to different shapes associated with a cleat member body, including but not limited to hexagonal, cylindrical, conical, circular, square, rectangular, trapezoidal, diamond, ovoid, as well as other regular or irregular and geometric or non-geometric shapes.

In some embodiments, mold cavity 102 may also include a fastener cavity portion 106. In an exemplary embodiment, fastener cavity portion 106 may correspond to a fastener element of a cleat member. In some cases, the fastener element of the cleat member may be provided to attach the cleat member to an outsole. In particular, the fastener element may be configured to releasably attach the cleat member to an outsole. In an exemplary embodiment, fastener cavity portion 106 may be configured to include a plurality of grooves configured to correspond to thread elements associated with a cleat member. With this arrangement, the cleat member may be screwed into a corresponding fastener receiving portion in a bottom surface of an outsole.

In some embodiments, molding system 100 may also include components configured to introduce material used for molding into mold cavity 102. In an exemplary embodiment, molding system 100 may include an injection cavity 110. In one embodiment, injection cavity 110 may include an injection tip that protrudes from molding system 100. In some embodiments, injection cavity 110 may be in fluid communication with mold cavity 102 via an orifice 108. With this arrangement, orifice 108 allows a liquid or viscous substance to pass through injection cavity 110 into mold cavity 102. In FIG. 1, only one injection cavity and orifice are shown, in other embodiments, however, molding system 100 may include additional injection cavities with corresponding orifices.

Figure 2:
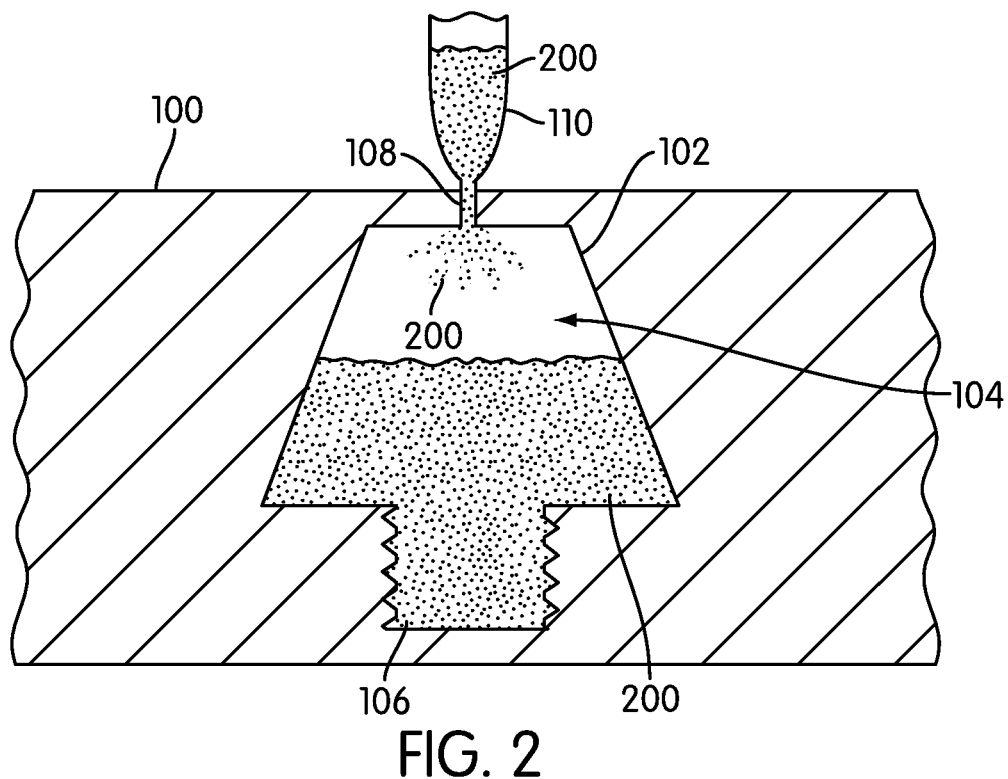
FIG. 2 is a schematic view of an exemplary embodiment of a molding system for a cleat member being filled with molding material.

Referring to FIG. 2, a schematic view of an exemplary embodiment of molding system 100 for a cleat member being filled with molding material 200 is shown. In an exemplary embodiment, molding material 200 may be a thermoplastic polyurethane (TPU) material. In different embodiments, however, various types of molding material 200 may be used to form a cleat member using molding system 100. In some embodiments, molding material 200 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 200. In addition, in some embodiments, a cleat member may be produced using more than one molding material 200.

As shown in FIG. 2, molding material 200 may be introduced into molding system 100 through injection cavity 110. In this embodiment, molding material 200 passes through orifice 108 into mold cavity 102 and begins to fill fastener cavity portion 106 and body cavity portion 104. In an exemplary embodiment, molding material 200 substantially fills mold cavity 102 to form a cleat member.

In other embodiments, more than one molding material may be used to fill mold cavity 102. In one embodiment, a first molding material may be used to fill fastener cavity portion 106 and a second molding material may be used to fill body cavity 104. In some cases, the first molding material and the second molding material may be different materials and/or have different properties. For example, the first molding material may be chosen from a substantially rigid material so as to provide a durable fastener element for a cleat member. Similarly, the second molding material may be chosen from a substantially deformable material so as to provide traction and/or abrasion resistance to a ground engaging portion of a cleat member. In an exemplary embodiment, the first molding material and the second molding material may be configured to bond to each other to form an integrated cleat member.

Figure 3:
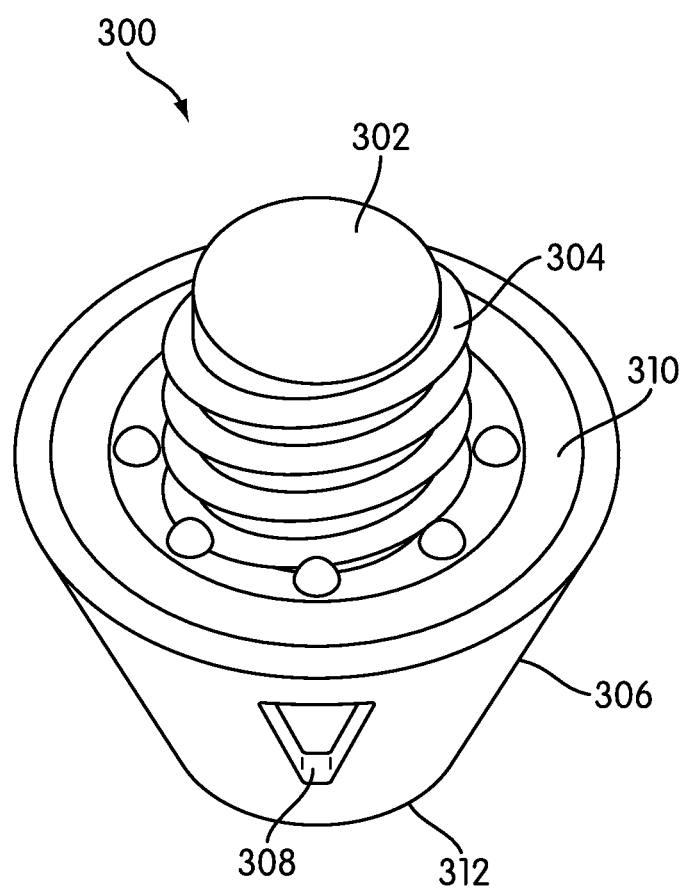
FIG. 3 is an isometric view of an exemplary embodiment of a cleat member.
Figure 4:
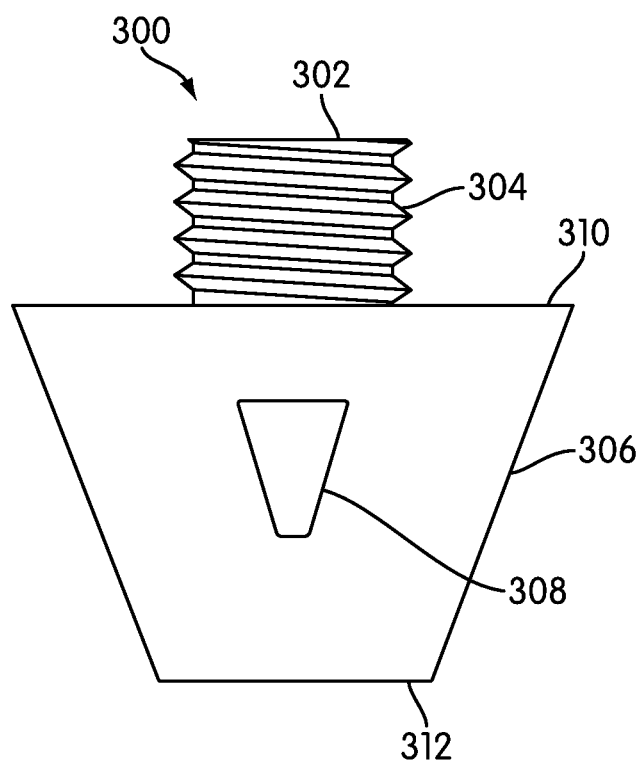
FIG. 4 is a side view of an exemplary embodiment of a cleat member.
Figure 5:
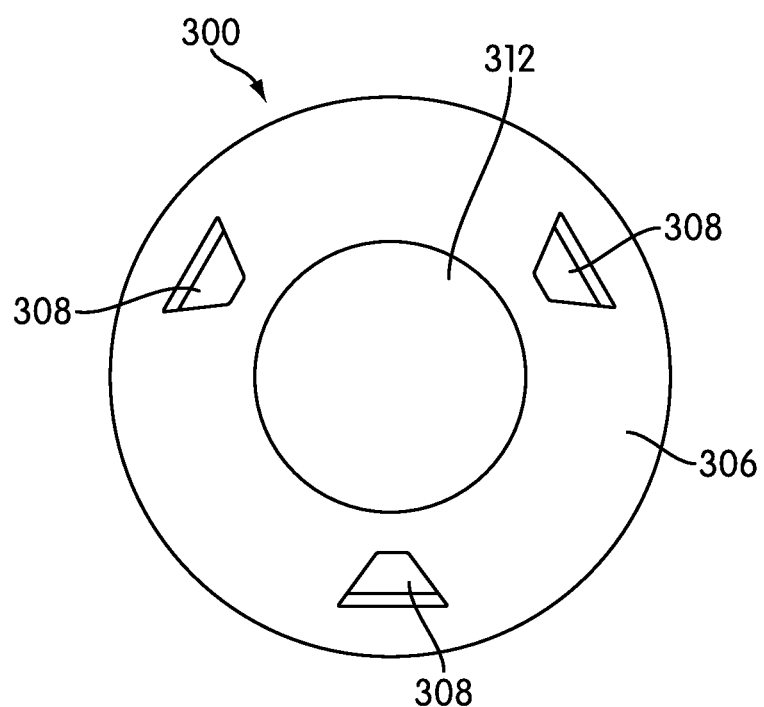
FIG. 5 is a top down view of an engaging surface on an exemplary embodiment of a cleat member.

FIGS. 3 through 5 illustrate different views of an exemplary embodiment of a cleat member 300 made using molding system 100. In some cases, a plurality of cleat members may be made in a substantially similar manner as cleat member 300. In other cases, other types of cleat members may be configured in a different manner.

FIG. 3 is an isometric view of an exemplary embodiment of cleat member 300. In an exemplary embodiment, cleat member 300 may include a fastener element 302 and a body 306. As previously discussed, fastener element 302 may correspond to fastener cavity portion 106 of mold cavity 102 and body 306 may correspond to body cavity portion 104 of mold cavity 102. In some embodiments, fastener element 302 may be configured to engage an article of footwear. In one embodiment, fastener element 302 includes a thread 304 to releasably attach cleat member 300 to an outsole. In some embodiments, body 306 of cleat member 300 may include a shoulder 310 and an engaging surface 312. In this embodiment, engaging surface 312 is disposed opposite of shoulder 310. In some cases, shoulder 310 may be provided to contact an outer surface of an outsole and engaging surface 312 may be configured to contact a ground surface and provide traction for an article of footwear. In some embodiment, shoulder 310 may include additional gripping elements that may be configured to hold cleat member 300 in place against the outer surface of the outsole.

FIG. 4 illustrates a side view of an exemplary embodiment of cleat member 300. In some embodiments, body 306 of cleat member 300 may be configured in a particular shape. In some cases, a particular shape of body 306 may be configured to provide traction for an article of footwear. In some embodiments, body 306 may have a conical shape with a generally flat engaging surface 312. In other embodiments, body 306 may have a cylindrical shape with a honed engaging surface 312. In an exemplary embodiment shown in FIG. 4, body 306 may have a truncated conical shape with a generally flat engaging surface 312 to provide traction for an article of footwear. In some embodiments, the truncated conical shape of body 306 may provide traction and control for an article of footwear during a range of movement. For example, the generally truncated conical shape of body 306 may help facilitate penetration of cleat member 300 into the ground surface.

FIG. 5 illustrates a top down view of engaging surface 312 on cleat member 300. In some embodiments, body 306 may include a substantially flat engaging surface 312. Generally, the term "engaging surface" as used in this detailed description and throughout the claims includes a portion of a cleat member that contacts a ground surface initially and/or when no ground penetration occurs. With this arrangement, substantially flat engaging surface 312 may provide cleat member 300 with a stable resting position on the ground surface.

As shown in FIGS. 3-5, in some embodiments, body 306 may be configured with additional provisions for engaging a tool that may attach cleat member 300 to an article of footwear. In some cases, body 306 may include one or more recessed portions 308. Generally, recessed portions 308 may be disposed at one or more portions of body 306. As shown in FIG. 5, in this embodiment, recessed portions 308 may be disposed at three locations around body 306. In an exemplary embodiment, recessed portions 308 may have a generally triangular shape. With this arrangement, recessed portions 308 may engage a tool to secure cleat member 300 to an outsole of an article.

In different embodiments, recessed portions may have any size and shape. Examples of various shapes include, but are not limited to, squares, rectangles, circles, ovals, polygonal and irregular shapes, as well as any other type of shape. Additionally, the depth of recessed portions can vary. By using different shapes recessed with different depths, recessed portions may be configured to engage a tool to attach a cleat member to an article of footwear.

FIGS. 6 through 9 illustrate various embodiments of molding systems for making a collar receptacle for a cleat member. In some embodiments, a molding system may be an overmolding system that includes a pre-molded cleat member. In other embodiments, a molding system may be a single mold. In other embodiments, a molding system may be a multi-part molding system, including one or more mold inserts. In still other embodiments, a molding system maybe a multi-stage molding system that includes two or more injections of molding material into a single molding system or a multi-part molding system. In some cases, the order of molding the components of a cleat assembly, as well as the choice of molding system, may be chosen based on various characteristics, including but not limited to one or more of: the molding materials chosen for each component, the hardness or durability of the component, the temperature of molding material, as well as other considerations. In addition, it should be understood that other molding systems other than the exemplary embodiments illustrated herein may be used to form a collar receptacle.

Figure 6:
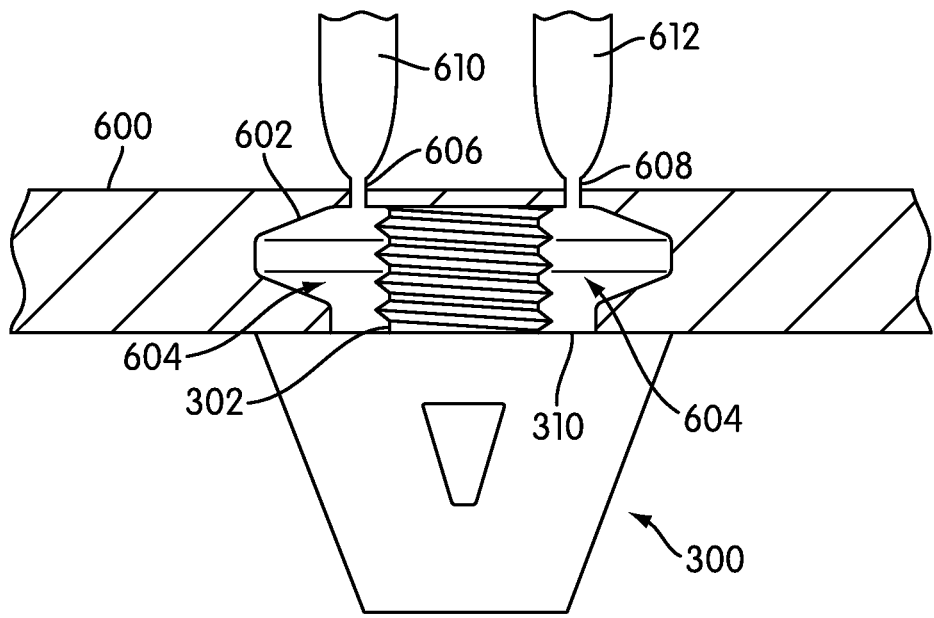
FIG. 6 is a schematic view of an exemplary embodiment of a molding system for a collar receptacle.

Referring now to FIG. 6, a schematic view of an exemplary embodiment of an overmolding system 600 for a collar receptacle is illustrated. In some embodiments, a collar receptacle may be made using an overmolding process with a portion of cleat member 300. In an exemplary embodiment, fastener element 302 of cleat member 300 may be used as part of overmolding system 600. In one embodiment, overmolding system 600 may be used to manufacture a collar receptacle that includes a fastener receiving portion that corresponds to fastener element 302 of cleat member 300. With this arrangement, a close fit may be provided between a cleat member and a collar receptacle.

In some embodiments, overmolding system 600 may include one or more components typically associated with an injection mold, including components not described herein. For example, in some embodiments, overmolding system 600 may include a number of pins, including retractable pins that may be used to hold cleat member 300 in position within overmolding system 600. In an exemplary embodiment, overmolding system 600 may include an overmold cavity 602. In some embodiments, overmold cavity 602 may be sized and dimensioned so as to correspond to a shape associated with a collar receptacle for engaging with a cleat member. Overmolding system 600 may be configured to make a collar receptacle that may engage with a cleat member of any type, shape, or configuration.

In some embodiments, overmold cavity 602 may include one or more portions configured to correspond to different portions of a collar receptacle. In an exemplary embodiment, overmold cavity 602 may include a collar cavity portion 604. In one embodiment, collar cavity portion 604 may correspond to an outer collar of a collar receptacle. In an exemplary embodiment, collar cavity portion 604 may be generally disc shaped. In other embodiments, collar cavity portion 604 may correspond to different shapes associated with a collar receptacle, including but not limited to hexagonal, square, rectangular, trapezoidal, diamond, circular, ovoid, as well as other regular or irregular and geometric or non-geometric shapes.

In some embodiments, overmold cavity 602 may also include fastener element 302 of cleat member 300. In an exemplary embodiment, overmold cavity 602 may be used to form a corresponding fastener receiving portion around fastener element 302. In some cases, the fastener receiving portion of the collar receptacle may be used to attach the cleat member to an outsole of an article of footwear by receiving the fastener element of the cleat member. In particular, the fastener receiving portion may be configured to releasably attach the cleat member to an outsole. In an exemplary embodiment, fastener element 302 may include thread 304 configured to form a corresponding plurality of grooves in the fastener receiving portion of the collar receptacle. With this arrangement, the cleat member may be screwed into the fastener receiving portion of the collar receptacle in a bottom surface of an outsole. Additionally, overmolding system 600 with overmold cavity 602 that includes fastener element 302 of cleat member 300 may produce a collar receptacle having a close fit with cleat member 300.

In some embodiments, overmolding system 600 may also include components configured to introduce molding material into overmold cavity 602. In an exemplary embodiment, overmolding system 600 may include a first injection cavity 610 and a second injection cavity 612. In one embodiment, first injection cavity 610 and second injection cavity 612 may each include an injection tip that protrudes from overmolding system 600. In some embodiments, first injection cavity 610 and second injection cavity 612 may be in fluid communication with overmold cavity 602. In an exemplary embodiment, first injection cavity 610 may be in fluid communication with overmold cavity 602 via a first orifice 606 and second injection cavity 612 may be in fluid communication with overmold cavity 602 via a second orifice 608. With this arrangement, first orifice 606 and/or second orifice 608 allow a liquid or viscous substance to pass through first injection cavity 610 and/or second injection cavity 612 into overmold cavity 602.

In the current embodiment illustrated in FIG. 6, two injection cavities with corresponding orifices are shown, one on each side of overmold cavity 602. With this arrangement, molding material may be provided substantially uniform around fastener element 302 of cleat member 300. In other embodiments, however, overmolding system 600 may include more or less injection cavities with corresponding orifices. Additionally, in other embodiments, the location and arrangement of injection cavities and corresponding orifices may vary.

Figure 7:
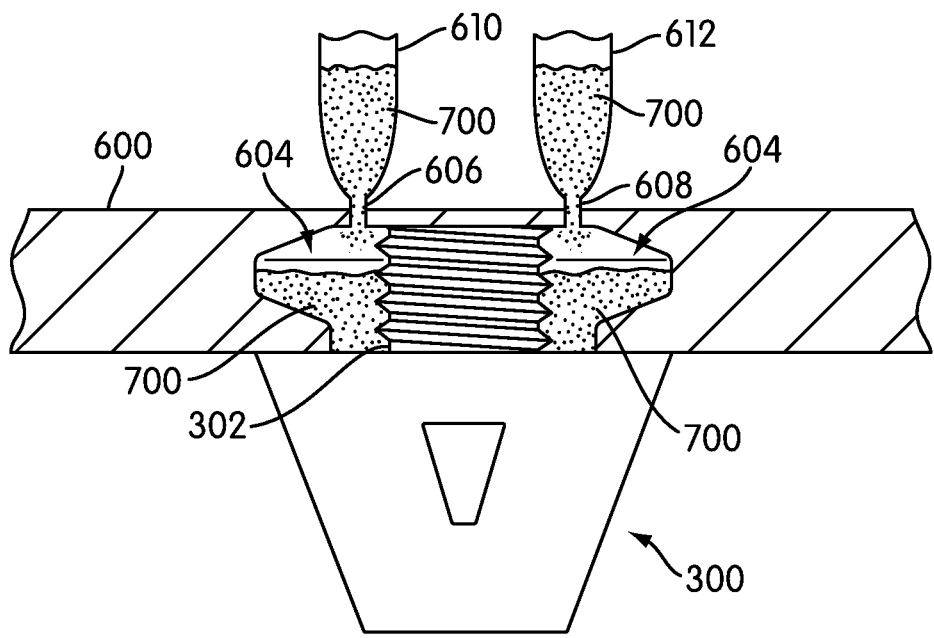
FIG. 7 is a schematic view of an exemplary embodiment of a molding system for a collar receptacle being filled with molding material.

Referring to FIG. 7, a schematic view of an exemplary embodiment of overmolding system 600 for a collar receptacle being filled with molding material 700 is shown. In an exemplary embodiment, molding material 700 may be a nylon material. In different embodiments, however, various types of molding material 700 may be used to form a collar receptacle using overmolding system 600. In some embodiments, molding material 700 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 700. In addition, in some embodiments, a collar receptacle may be produced using more than one molding material 700.

In some embodiments, molding material 700 may be a non-compatible material with the material of cleat member 300. Generally, the term "non-compatible" or "incompatible" as used in this detailed description and throughout the claims means materials that normally do not bond with each other. In an exemplary embodiment, molding material 700 of the collar receptacle may be non-compatible with the molding material forming cleat member 300, and in particular, fastener element 302, including molding material 200 described above. With this arrangement, overmolding of the collar receptacle with a non-compatible material around fastener element 302 to form the threaded fastener receiving portion, as described above, will allow a releasable attachment. As a result, cleat member 300 may be releasably attached to an outsole of an article.

In other embodiments, agents may be added to molding material 700 and/or sprayed on portions of cleat member 300, including fastener element 302, prior to and/or during injection of molding material 700 to further ensure non-compatibility between cleat member 300 and the collar receptacle. In addition, other known techniques may be used to prevent bonding between the materials of cleat member 300 and the collar receptacle.

As shown in FIG. 7, molding material 700 may be introduced into overmolding system 600 through first injection cavity 610 and second injection cavity 612. In this embodiment, molding material 700 passes through first orifice 606 and second orifice 608 into overmold cavity 602 and begins to fill collar cavity portion 604. In an exemplary embodiment, molding material 700 fills in around fastener element 302 within collar cavity portion 604. In an exemplary embodiment, molding material 700 substantially fills overmold cavity 602 around fastener element 302 to form a collar receptacle.

Figure 8:
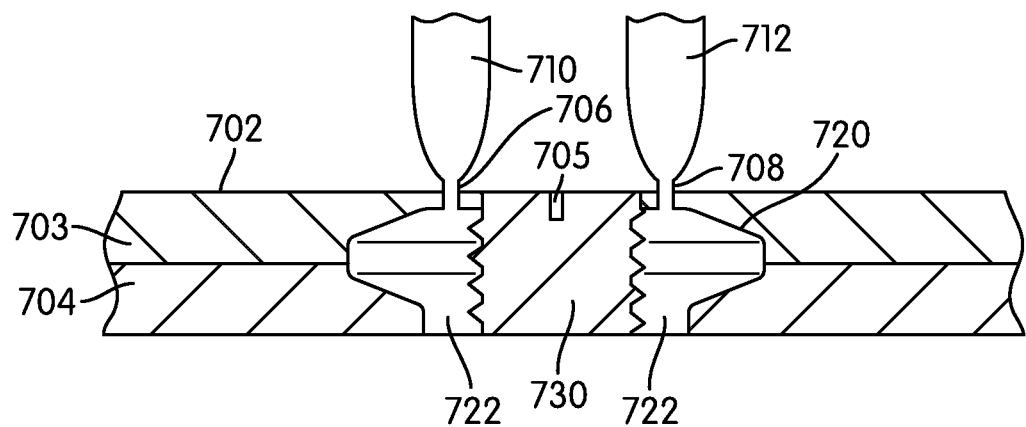
FIG. 8 is a schematic view of an alternate embodiment of a molding system for a collar receptacle.

Referring now to FIG. 8, a schematic view of an alternate embodiment of a molding system 702 for a collar receptacle is illustrated. In some embodiments, a collar receptacle may be made using a molding process with a single mold or a multi-part molding system. In one embodiment, molding system 702 may be configured to manufacture a collar receptacle that includes a fastener receiving portion that corresponds to fastener element 302 of cleat member 300. With this arrangement, a close fit may be provided between a cleat member and a collar receptacle.

In some embodiments, molding system 702 may include one or more components typically associated with an injection mold, including components not described herein. For example, in some embodiments, molding system 702 may include a number of pins, including retractable pins that may be used to remove the finished collar receptacle from molding system 702. In an exemplary embodiment, molding system 702 may include a mold cavity 722. In some embodiments, mold cavity 722 may be sized and dimensioned so as to correspond to a shape associated with a collar receptacle for engaging with a cleat member. Molding system 702 may be configured to make a collar receptacle that may engage with a cleat member of any type, shape, or configuration.

In an exemplary embodiment, molding system 702 may include multiple molds and/or components configured to release the finished part from molding system 702. In this embodiment, molding system 702 includes a top plate 703 and a bottom plate 704. In some embodiments, top plate 703 and bottom plate 704 may allow molding system 702 to be separated after manufacture of the collar receptacle to remove the finished part. In one embodiment, molding system 702 may further include one or more removable inserts or additional components that fit into top plate 703 and/or bottom plate 704. In this embodiment, fastener mold portion 730 may be a removable insert that attaches to bottom plate 704. As shown in FIG. 8, fastener mold portion 730 may include a female engagement portion 705 that is configured to allow fastener mold portion 730 to be attached to bottom plate 704. In some cases, fastener mold portion 730 may be screwed into bottom plate 704 using female engagement portion 705. In other cases, fastener mold portion 730 may be fitted into top plate 703 and/or bottom plate 704 in a removable manner so as to allow the finished part to be removed from molding system 702.

Figure 9:
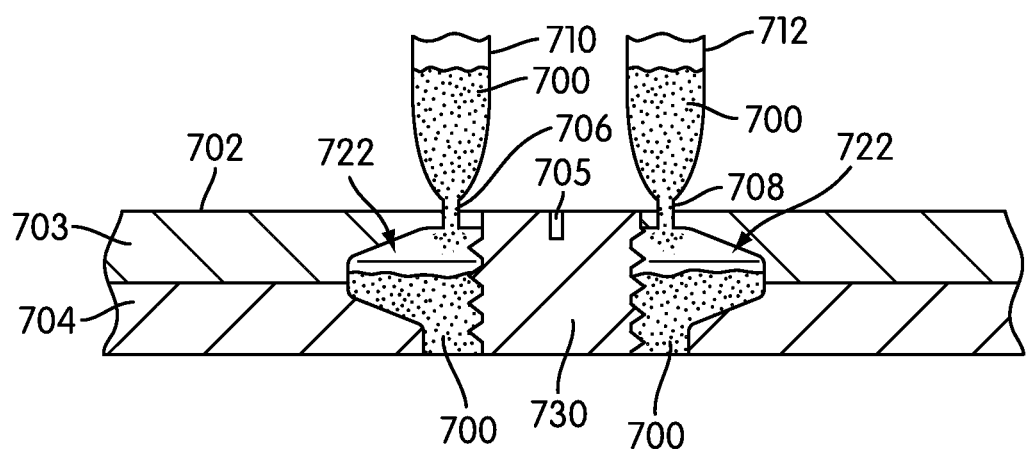
FIG. 9 is a schematic view of an alternate embodiment of a molding system for a collar receptacle being filled with molding material.

Molding system 702 is illustrated in FIGS. 8 and 9 with multiple molds and/or components that are configured to facilitate removal of the finished parts from the molds. It should be understood that for the purposes of illustration, the molds and/or molding systems illustrated herein in various embodiments are shown in a representative manner without illustration of multiple molds, inserts, and/or components that may be associated with the mold and/or molding system. Any of the molds and/or molding systems described herein may include similar or different constructions as are known in the art for facilitating removal of the finished parts after injection and cooling of the molding material(s) as shown in reference to FIGS. 8 and 9.

In some embodiments, mold cavity 722 may include one or more portions configured to correspond to different portions of a collar receptacle. In an exemplary embodiment, mold cavity 722 may include a collar cavity portion that corresponds to an outer collar of a collar receptacle. In an exemplary embodiment, the collar cavity portion may be generally disc shaped. In other embodiments, the collar cavity portion may correspond to different shapes associated with a collar receptacle, including but not limited to hexagonal, square, rectangular, trapezoidal, diamond, circular, ovoid, as well as other regular or irregular and geometric or non-geometric shapes.

In some embodiments, mold cavity 722 may also include a fastener mold portion 730. Fastener mold portion 730 may correspond to a shape of a fastener element 302 of cleat member 300. In some embodiments, fastener mold portion 730 may be integrally formed with molding system 702. In other embodiments, fastener mold portion 730 may be removable from molding system 702. In some cases, fastener mold portion 730 may be an insert or part of a multi-mold molding system. With this removable arrangement, fastener mold portion 730 may be removed from molding system 702 after the collar receptacle has been molded.

In an exemplary embodiment, fastener mold portion 730 may be used to form a corresponding fastener receiving portion configured to be mated with fastener element 302. In some cases, the fastener receiving portion of the collar receptacle may be used to attach the cleat member to an outsole of an article of footwear by receiving the fastener element of the cleat member. In particular, the fastener receiving portion may be configured to releasably attach the cleat member to an outsole. In an exemplary embodiment, fastener element 302 may include thread 304 configured to form a corresponding plurality of grooves in the fastener receiving portion of the collar receptacle. With this arrangement, the cleat member may be screwed into the fastener receiving portion of the collar receptacle in a bottom surface of an outsole. Additionally, molding system 702 with fastener mold portion 730 that corresponds to a shape of fastener element 302 of cleat member 300 may produce a collar receptacle having a close fit with cleat member 300.

In some embodiments, molding system 702 may also include components configured to introduce molding material into mold cavity 722. In an exemplary embodiment, molding system 702 may include a first injection cavity 710 and a second injection cavity 712. In one embodiment, first injection cavity 710 and second injection cavity 712 may each include an injection tip that protrudes from molding system 702. In some embodiments, first injection cavity 710 and second injection cavity 712 may be in fluid communication with mold cavity 722. In an exemplary embodiment, first injection cavity 710 may be in fluid communication with mold cavity 722 via a first orifice 706 and second injection cavity 712 may be in fluid communication with mold cavity 722 via a second orifice 708. With this arrangement, first orifice 706 and/or second orifice 708 allow a liquid or viscous substance to pass through first injection cavity 710 and/or second injection cavity 712 into mold cavity 722.

In the current embodiment illustrated in FIG. 8, two injection cavities with corresponding orifices are shown, one on each side of mold cavity 722. With this arrangement, molding material may be provided substantially uniform around fastener mold portion 730. In other embodiments, however, molding system 702 may include more or less injection cavities with corresponding orifices. Additionally, in other embodiments, the location and arrangement of injection cavities and corresponding orifices may vary.

Referring to FIG. 9, a schematic view of an alternate embodiment of molding system 702 for a collar receptacle being filled with molding material 700 is shown. In an exemplary embodiment, molding material 700 may be a nylon material. In different embodiments, however, various types of molding material 700 may be used to form a collar receptacle using molding system 702. In some embodiments, molding material 700 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 700. In addition, in some embodiments, a collar receptacle may be produced using more than one molding material 700.

In an exemplary embodiment, molding material 700 may be a harder and/or more durable material than the molding material forming cleat member 300, and in particular, fastener element 302, including molding material 200 described above. In other embodiments, molding material 700 may be a non-compatible material with the material of cleat member 300, as described above. In still other embodiments, agents may be added to molding material 700 and/or sprayed on portions of mold cavity 722, including fastener mold portion 730, prior to and/or during injection of molding material 700 to assist with the removal of the collar receptacle from mold system 702.

As shown in FIG. 9, molding material 700 may be introduced into molding system 702 through first injection cavity 710 and second injection cavity 712. In this embodiment, molding material 700 passes through first orifice 706 and second orifice 708 into mold cavity 722 and begins to fill the collar cavity portion. In an exemplary embodiment, molding material 700 fills in around fastener mold portion 730 within mold cavity 722. In an exemplary embodiment, molding material 700 substantially fills mold cavity 722 around fastener mold portion 730 to form a collar receptacle.

Figure 10:
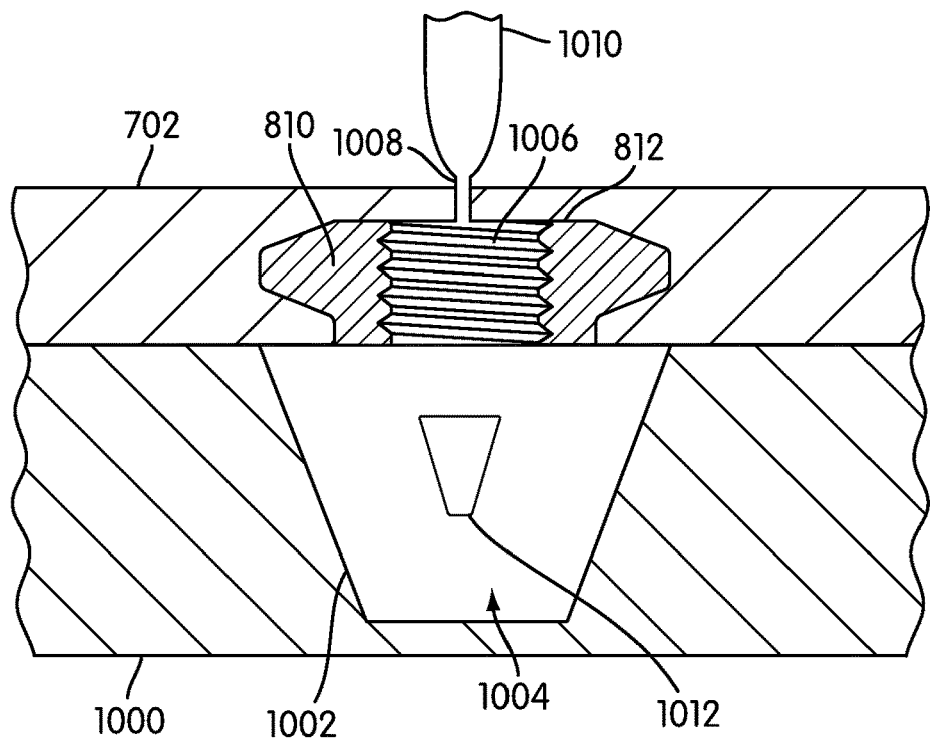
FIG. 10 is a schematic view of an alternate embodiment of a molding system for a cleat member.

Referring now to FIG. 10, a schematic view of an alternate embodiment of a molding system for a cleat member is illustrated. In some embodiments, a multi-part molding system may be used to make a cleat member using one or more pre-formed components. In an exemplary embodiment, a multi-part molding system may use a pre-formed collar receptacle and a through molding system to make a cleat member. In one embodiment, a multi-part molding system may include molding system 702 and a through molding system 1000. In some embodiments, molding system 702 may include a collar receptacle 810 that has been formed using the process described above. In this embodiment, through molding system 1000 may be used together with collar receptacle 810 to make a cleat member. In one embodiment, through molding system 1000 may be used to manufacture a cleat member that includes a fastener element that corresponds to the fastener receiving portion of collar receptacle 810. With this arrangement, a close fit may be provided between a cleat member and a collar receptacle.

In some embodiments, through molding system 1000 may be an injection mold. Through molding system 1000 may include one or more components typically associated with an injection mold, including components not described herein. In an exemplary embodiment, through molding system 1000 may include a mold cavity 1002. In some embodiments, mold cavity 1002 may be sized and dimensioned so as to correspond to a shape associated with a cleat member. Through molding system 1000 may be configured to make a cleat member of any type, shape, or configuration.

In some embodiments, mold cavity 1002 may include one or more portions configured to correspond to different portions of a cleat member. In an exemplary embodiment, mold cavity 1002 may include a body cavity portion 1004. In an exemplary embodiment, body cavity portion 1004 may correspond to a body of a cleat member. In an exemplary embodiment, body cavity portion 1004 may correspond to a substantially conical shaped cleat member body. In other embodiments, body cavity portion 1004 may correspond to different shapes associated with a cleat member body, including but not limited to hexagonal, cylindrical, conical, circular, square, rectangular, trapezoidal, diamond, ovoid, as well as other regular or irregular and geometric or non-geometric shapes.

In some embodiments, mold cavity 1002 may also include a fastener cavity portion 1006. In an exemplary embodiment, fastener cavity portion 1006 may correspond to a fastener element of a cleat member. In this embodiment, fastener cavity portion 1006 corresponds to a hole 812 within collar receptacle 810 that includes the fastener receiving portion. In some cases, the fastener element of the cleat member may be provided to attach the cleat member to an outsole. In particular, the fastener element may be configured to releasably attach the cleat member to an outsole. In an exemplary embodiment, fastener cavity portion 1006 may be configured to include a plurality of grooves configured to correspond to thread elements associated with a cleat member. With this arrangement, the cleat member may be screwed into a corresponding fastener receiving portion in collar receptacle 810.

In some embodiments, through molding system 1000 may also include components configured to introduce material used for molding into mold cavity 1002. In an exemplary embodiment, through molding system 1000 may include an injection cavity 1010. In one embodiment, injection cavity 1010 may include an injection tip that protrudes from through molding system 1000. In some embodiments, injection cavity 1010 may be in fluid communication with mold cavity 1002 via an orifice 1008 and through hole 812 of collar receptacle 810. With this arrangement, orifice 1008 allows a liquid or viscous substance to pass through injection cavity 1010 and hole 812 of collar receptacle 810 into mold cavity 1002. In FIG. 10, only one injection cavity and orifice are shown, in other embodiments, however, through molding system 1000 may include additional injection cavities with corresponding orifices.

Figure 11:
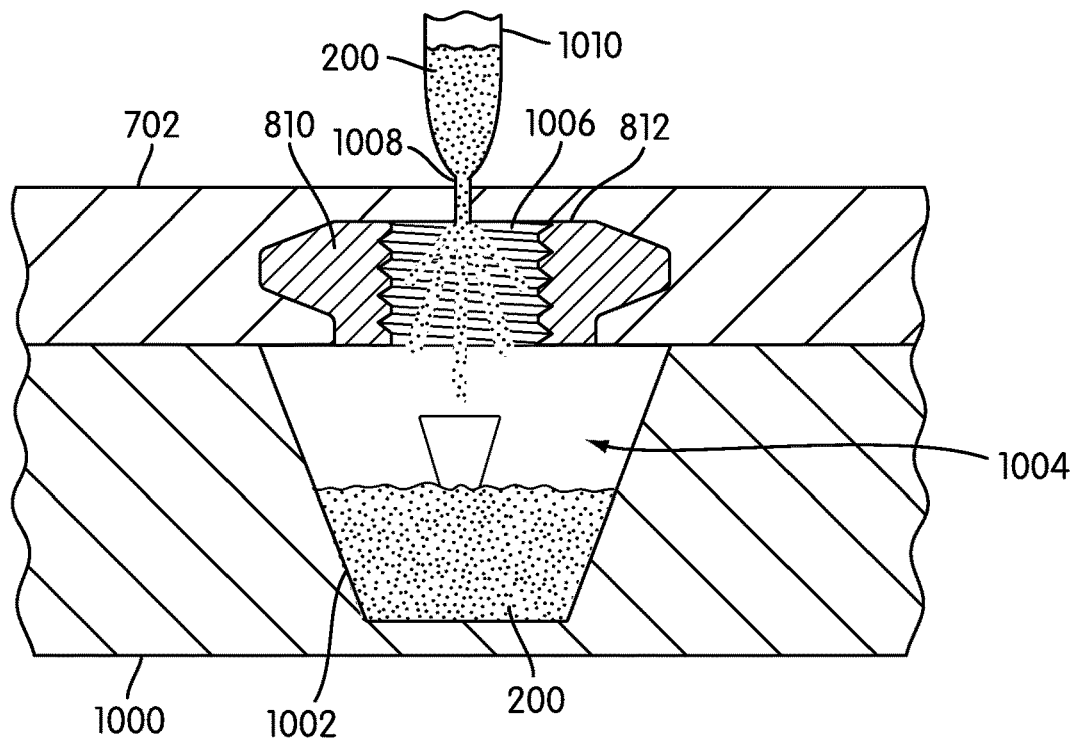
FIG. 11 is a schematic view of an alternate embodiment of a molding system for a cleat member being filled with molding material.

Referring to FIG. 11, a schematic view of an alternate embodiment of through molding system 1000 for a cleat member being filled with molding material 200 is shown. In an exemplary embodiment, molding material 200 may be a thermoplastic polyurethane (TPU) material. In different embodiments, however, various types of molding material 200 may be used to form a cleat member using molding system 100. In some embodiments, molding material 200 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 200. In addition, in some embodiments, a cleat member may be produced using more than one molding material 200. In an exemplary embodiment, molding material 200 may be a non-compatible material with the material of collar receptacle 810, including molding material 700, as described above.

As shown in FIG. 11, molding material 200 may be introduced into through molding system 1000 through injection cavity 1010 and hole 812 of collar receptacle 810. In this embodiment, molding material 200 passes through orifice 1008 and hole 812 into mold cavity 1002 and begins to fill body cavity portion 1004 and fastener cavity portion 1006. In an exemplary embodiment, molding material 200 substantially fills mold cavity 1002 and fastener cavity portion 1006 to form a cleat member.

Figure 12:
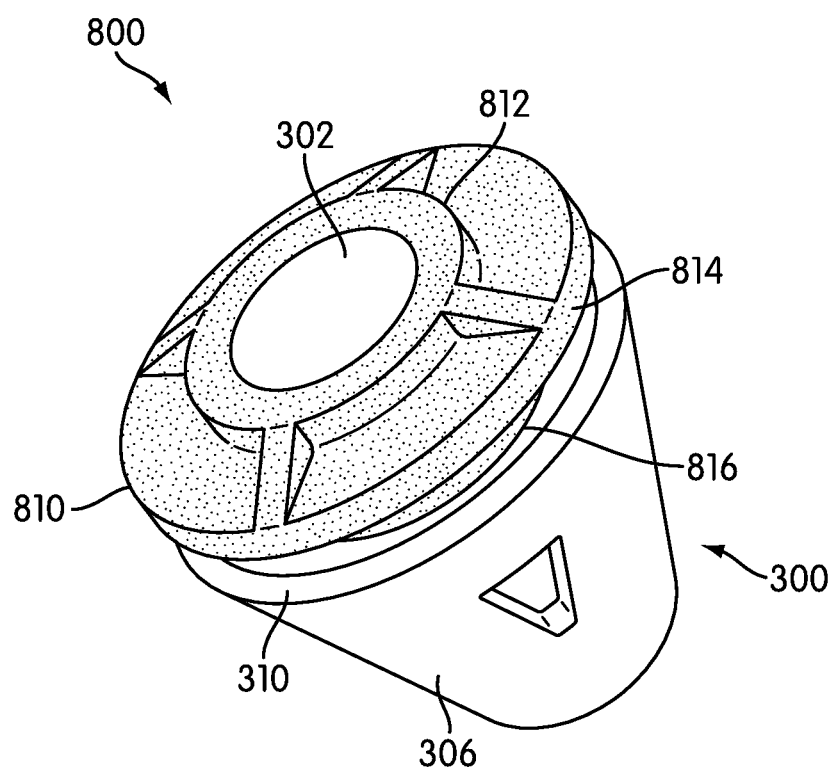
FIG. 12 is an isometric view of an exemplary embodiment of a cleat assembly.
Figure 13:
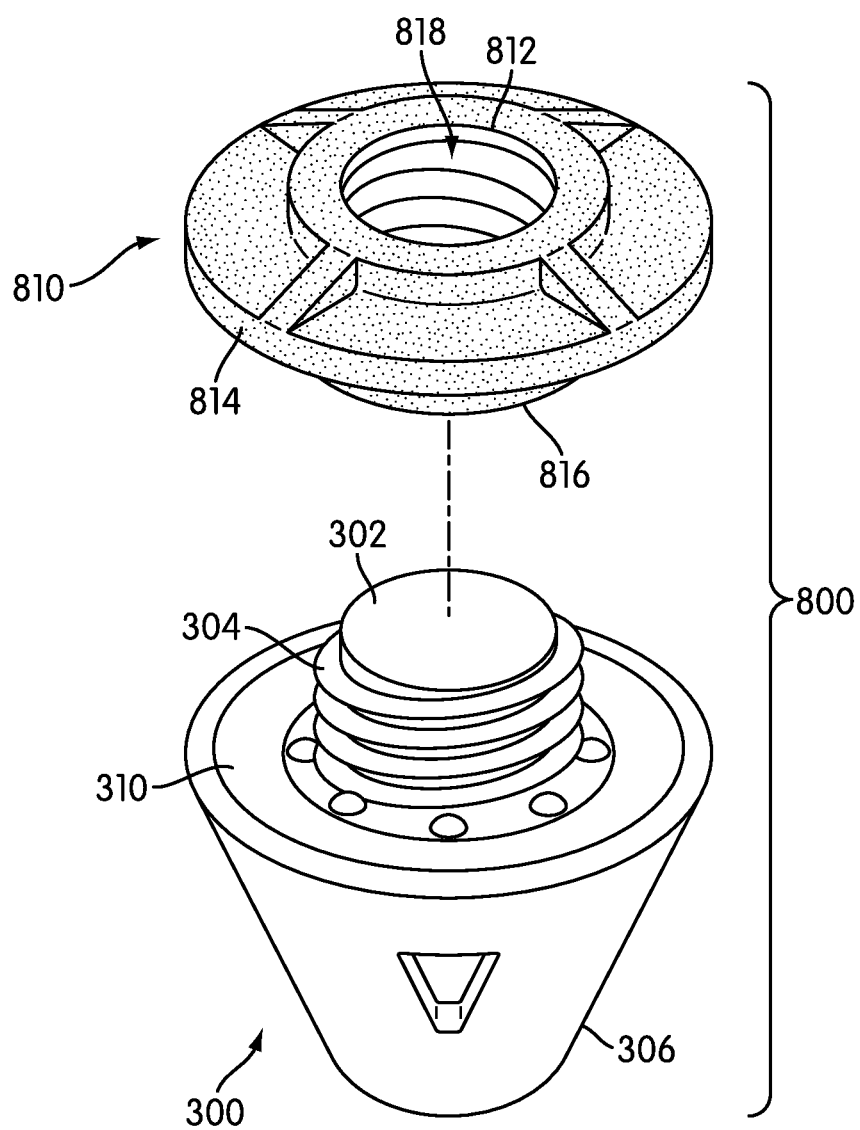
FIG. 13 is an exploded view of an exemplary embodiment of a cleat assembly.
Figure 14:
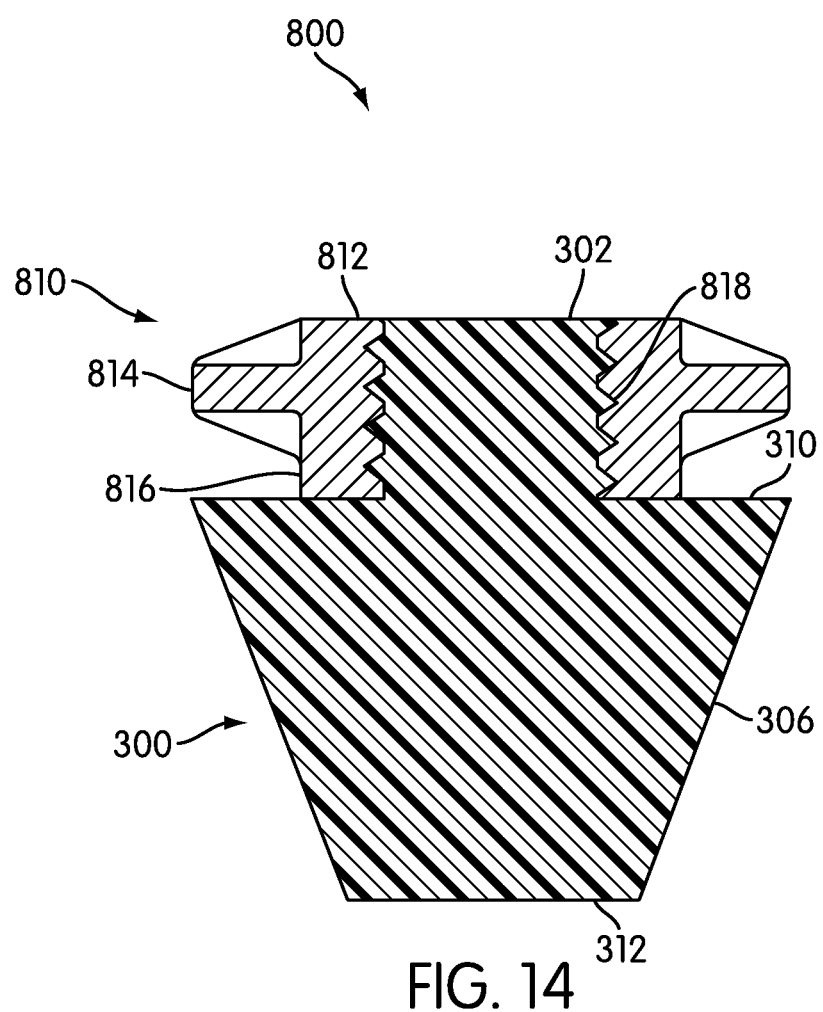
FIG. 14 is a cross-sectional view of an exemplary embodiment of a cleat assembly.

FIGS. 12 through 14 illustrate an exemplary embodiment of a cleat assembly formed by one or more of the various molding systems described above. In various embodiments, the cleat assembly described herein may be formed using any embodiment of a molding system, including, but not limited to overmolding system 600, molding system 702, and/or through molding system 1000.

FIG. 12 is an isometric view of an exemplary embodiment of a cleat assembly formed by a molding system as described above. In some embodiments, cleat member 300 and a collar receptacle 810 may be removed from a molding system as a combined cleat assembly 800. In this embodiment, cleat assembly 800 may be formed from a combination of cleat member 300 and collar receptacle 810. In an exemplary embodiment, collar receptacle 810 may include a hole 812 configured to receive cleat member 300. In some embodiments, collar receptacle 810 may include a girdle 814 defining an outer perimeter of collar receptacle 810. In an exemplary embodiment, girdle 814 may provide support for mounting collar receptacle within an outsole, as further described below. Additionally, in some embodiments, collar receptacle 810 may include a bottom surface 816. In this embodiment, bottom surface 816 contacts shoulder 310 of cleat member 300 when cleat member 300 and collar receptacle 810 are fully engaged. In other embodiments, bottom surface 816 may provide support to cleat member 300 when engaging with a ground surface.

In this embodiment, collar receptacle 810 is shown engaged with cleat member 300. As shown in FIG. 12, fastener element 302 of cleat member 300 is disposed through hole 812 in collar receptacle 810. In some embodiments, when collar receptacle 810 is fully tightened onto fastener element 302 of cleat member 300, a surface of fastener element 302 may sit flush with hole 812 in collar receptacle 810.

FIG. 13 illustrates an exploded view of an exemplary embodiment of cleat assembly 800. In this embodiment, collar receptacle 810 is shown disengaged or released from cleat member 300. In an exemplary embodiment, thread 304 of fastener element 302 corresponds with fastener receiving portion 818 of collar receptacle 810 formed during the molding process described above. With this arrangement, cleat member 300 and collar receptacle 810 may be releasably attached. Additionally, in some embodiments, a tool may be used to engage recessed portions 308 to assist screwing cleat member 300 into the corresponding fastener receiving portion 818 of collar receptacle 810 embedded in an outsole of an article.

FIG. 14 illustrates a cross-sectional view of an exemplary embodiment of cleat assembly 800. In this embodiment, fastener element 302 of cleat member 300 is shown disposed through hole 812 in collar receptacle 810. In an exemplary embodiment, fastener receiving portion 818 may engage thread 304 of fastener element 302, as described above. In some embodiments, girdle 814 extends around an outer perimeter of collar receptacle 810. In an exemplary embodiment, girdle 814 may have a substantially similar diameter as shoulder 310 of cleat member 300. In other embodiments, girdle 814 may be larger or smaller than shoulder 310. In one embodiment, girdle 814 may provide support for embedding collar receptacle 810 into a molded outsole, as further described below. In some embodiments, collar receptacle 810 may include bottom surface 816. In this embodiment, bottom surface 816 contacts shoulder 310 of cleat member 300 when cleat member 300 and collar receptacle 810 are fully engaged. In some embodiments, bottom surface 816 may provide support to cleat member 300 when engaging surface 312 contacts a ground surface.

Figure 15:
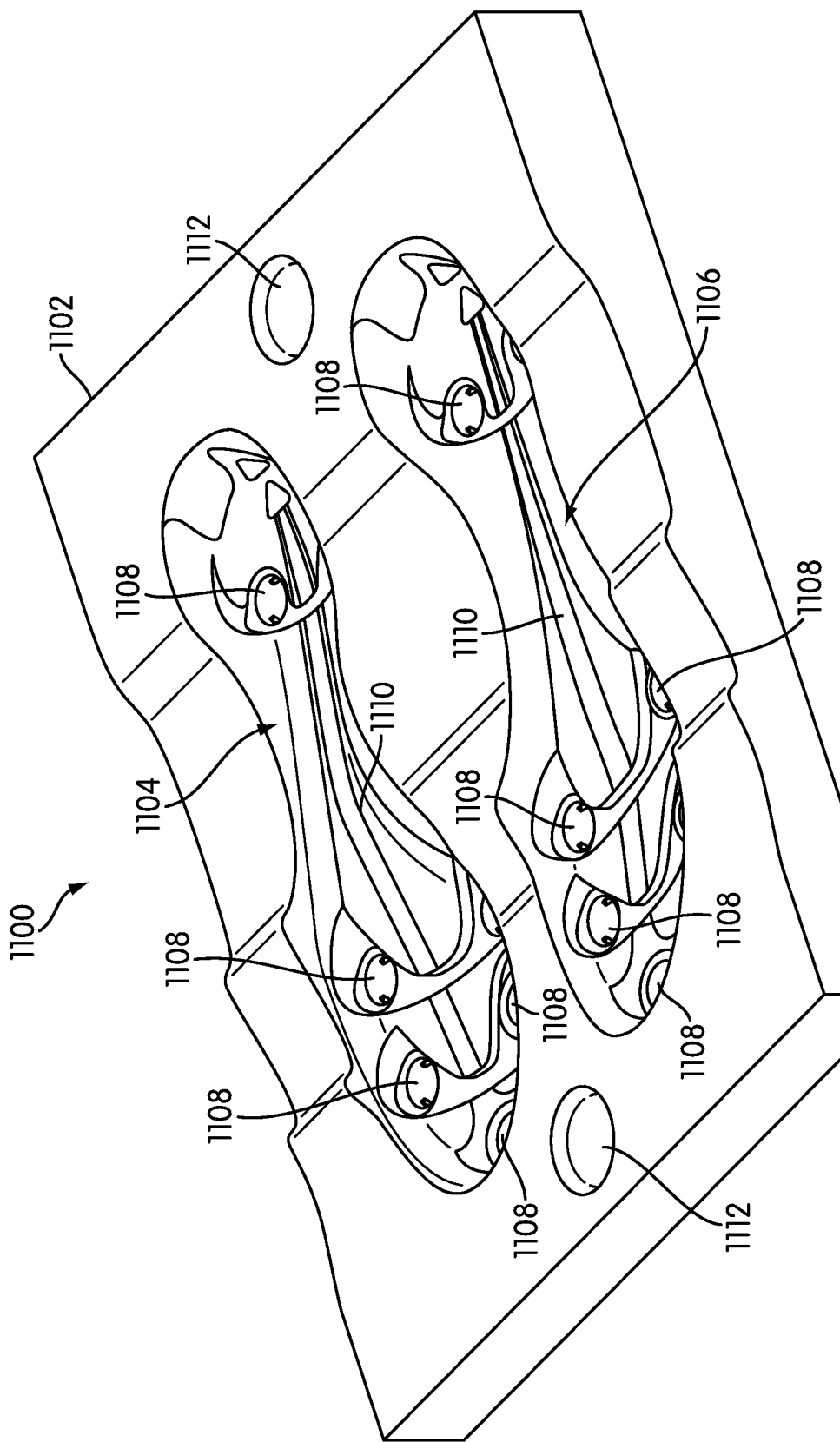
FIG. 15 is a schematic view of an exemplary embodiment of a molding system for a cleated plate member.

Referring now to FIGS. 15 through 20, a method for forming a cleated plate member is illustrated. In some embodiments, the cleated plate member may include a plurality of cleat assemblies made using one or more of the molding processes described above. FIG. 15 illustrates a schematic view of an exemplary embodiment of a molding system 1100 for a cleated plate member. In some embodiments, molding system 1100 may include one or more components typically associated with an injection mold, including components not described herein.

In some embodiments, molding system 1100 may include a molding base 1102. In an exemplary embodiment, molding base 1102 may include one or more plate cavities that may be sized and dimensioned so as to correspond to a shape associated with a cleated plate member. Generally, the term "cleated plate member" as used in this detailed description and throughout the claims includes an element configured to be disposed as an outsole for an article of footwear that includes one or more cleat members. In an exemplary embodiment, a cleated plate member may comprise essentially an entirety of an outsole of an article of footwear. In other embodiments, a cleated plate member may comprise a portion of an outsole of an article of footwear, including, but not limited to one or more of a forefoot region, a midfoot region, and/or a heel region. Additionally, in other embodiments, different configurations of a cleated plate member may be included in an article of footwear.

In some embodiments, molding system 1100 may include provisions for making a matched pair of cleated plate members. In an exemplary embodiment, molding base 1102 may include a first plate cavity 1104 and a second plate cavity 1106. In one embodiment, first plate cavity 1104 may be used to form a cleated plate member associated with a right foot and second plate cavity 1106 may be used to form a cleated plate member associated with a left foot. In other embodiments, molding base 1102 may include one or more plate cavities used for form cleated plate members associated with either foot. In some cases, molding base 1102 may include more or less plate cavities used to form various cleated plate members. Additionally, in other embodiments, molding system 1100 may include multiple molding bases used to form different or similar cleated plate members.

In some embodiments, each plate cavity may include one or more cleat assembly receptacles 1108. Cleat assembly receptacles 1108 may be configured to receive a cleat assembly, including cleat assembly 800 described above. In an exemplary embodiment, cleat assembly receptacles 1108 are sized and dimensioned so as to hold a cleat assembly in place within a plate cavity, including first plate cavity 1104 and second plate cavity 1106, so that a portion of the cleat assembly may be embedded within the material used to form the cleated plate member. In this embodiment, each of first plate cavity 1104 and second plate cavity 1106 include a plurality of cleat assembly receptacles 1108. In an exemplary embodiment, the plurality of cleat assembly receptacles 1108 may be arranged at various portions of first plate cavity 1104 and/or second plate cavity 1106 to form a cleated plate member with cleat members disposed at corresponding locations. In the embodiment shown in FIG. 15, first plate cavity 1104 and second plate cavity 1106 include a plurality of cleat assembly receptacles 1108 located at portions corresponding to a forefoot region and a heel region. In other embodiments, first plate cavity 1104 and/or second plate cavity 1106 may include different numbers of cleat assembly receptacles 1108 arranged at various locations.

In some embodiments, each of first plate cavity 1104 and second plate cavity 1106 may include a plate body cavity portion 1110. In an exemplary embodiment, plate body cavity portion 1110 may be used to form the body of the cleated plate member that is configured to hold the cleat members in place within the cleated plate member. In one embodiment, plate body cavity portion 1110 may be used to form a cleated plate member that may comprise essentially an entirety of an outsole of an article of footwear. In other embodiments, plate body cavity portion 1110 may be used to form a cleated plate member that may comprise only a portion of an outsole of an article of footwear, including, but not limited to one or more of a forefoot region, a midfoot region, and/or a heel region. Additionally, in some embodiments, plate body cavity portion 1110 may include additional elements used to form structural and/or aesthetic components of a cleated plate member. In one embodiment, plate body cavity portion 1110 may include one or more grooves that may be used to form transverse and/or longitudinal ribs along a cleated plate member.

In an exemplary embodiment, molding system 1100 may include provisions for aligning a molding top over molding base 1102. In an exemplary embodiment, molding base 1102 may include one or more guiding holes 1112 for aligning placement of a molding top. In this embodiment, guiding holes 1112 may be disposed on either side of molding base between first plate cavity 1104 and second plate cavity 1106. In some embodiments, guiding holes 1112 may be recessed into molding base 1102 so as to allow for a tight fit with a molding top to prevent any material spreading between first plate cavity 1104 and second plate cavity 1106. In other embodiments, molding system 1100 may include additional components typically associated with an injection mold, including components not described herein.

Figure 16:
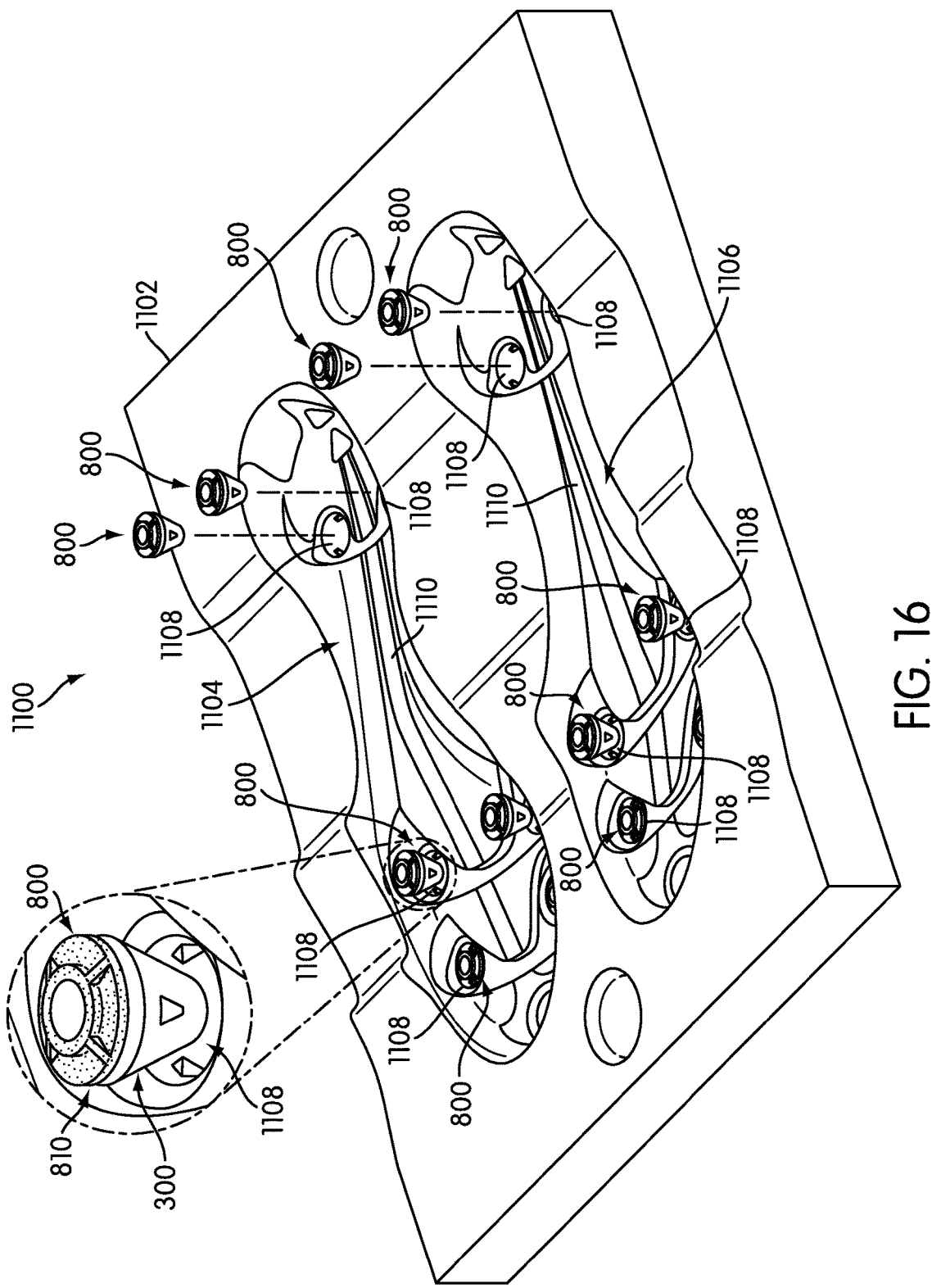
FIG. 16 is an exploded view of an exemplary embodiment of a plurality of cleat assemblies being placed into a molding system for a cleated plate member.

Referring now to FIG. 16, in some embodiments, each of first plate cavity 1104 and second plate cavity 1106 may receive one or more cleat assemblies 800 within cleat assembly receptacles 1108. As described above, in an exemplary embodiment, cleat assembly receptacles 1108 are sized and dimensioned so as to hold cleat assembly 800 in place within a plate cavity, including first plate cavity 1104 and second plate cavity 1106. In one embodiment, cleat assembly receptacles 1108 may be associated with a depth that corresponds to a portion of cleat assembly 800. In an exemplary embodiment, the depth of cleat assembly receptacle 1108 may substantially correspond to the size of cleat member 300 portion of cleat assembly 800 and collar receptacle 810 portion of cleat assembly 800 may extend above cleat assembly receptacle 1108. With this arrangement, collar receptacle 810 may be embedded within the material used to form the cleated plate member. As shown in this embodiment, each of first plate cavity 1104 and second plate cavity 1106 include seven cleat assembly receptacles 1108 for receiving cleat assemblies 800 at location corresponding to a heel region and a forefoot region of the cleated plate member. However, as explained above, in other embodiments, first plate cavity 1104 and/or second plate cavity 1106 may include different numbers of cleat assembly receptacles 1108 arranged at various locations.

In some embodiments, molding system 1100 may be configured with cleat assembly receptacles 1108 within plate cavities that correspond to and receive cleat assembly 800 that is the completed product of a molding system, as described above. With this arrangement, molding system 1100 may incorporate pre-manufactured cleat assemblies 800 into a cleated plate member. As a result, in some embodiments where cleat assembly 800 includes collar receptacle 810 that is configured to releasably attach cleat member 300, molding system 1100 may produce a cleated plate member that includes releasable cleat members already attached to the cleated plate member via collar receptacle 810. With this arrangement, labor and equipment requirements associated with providing a separate process to insert threads into the cleated plate member may be reduced.

Figure 17:
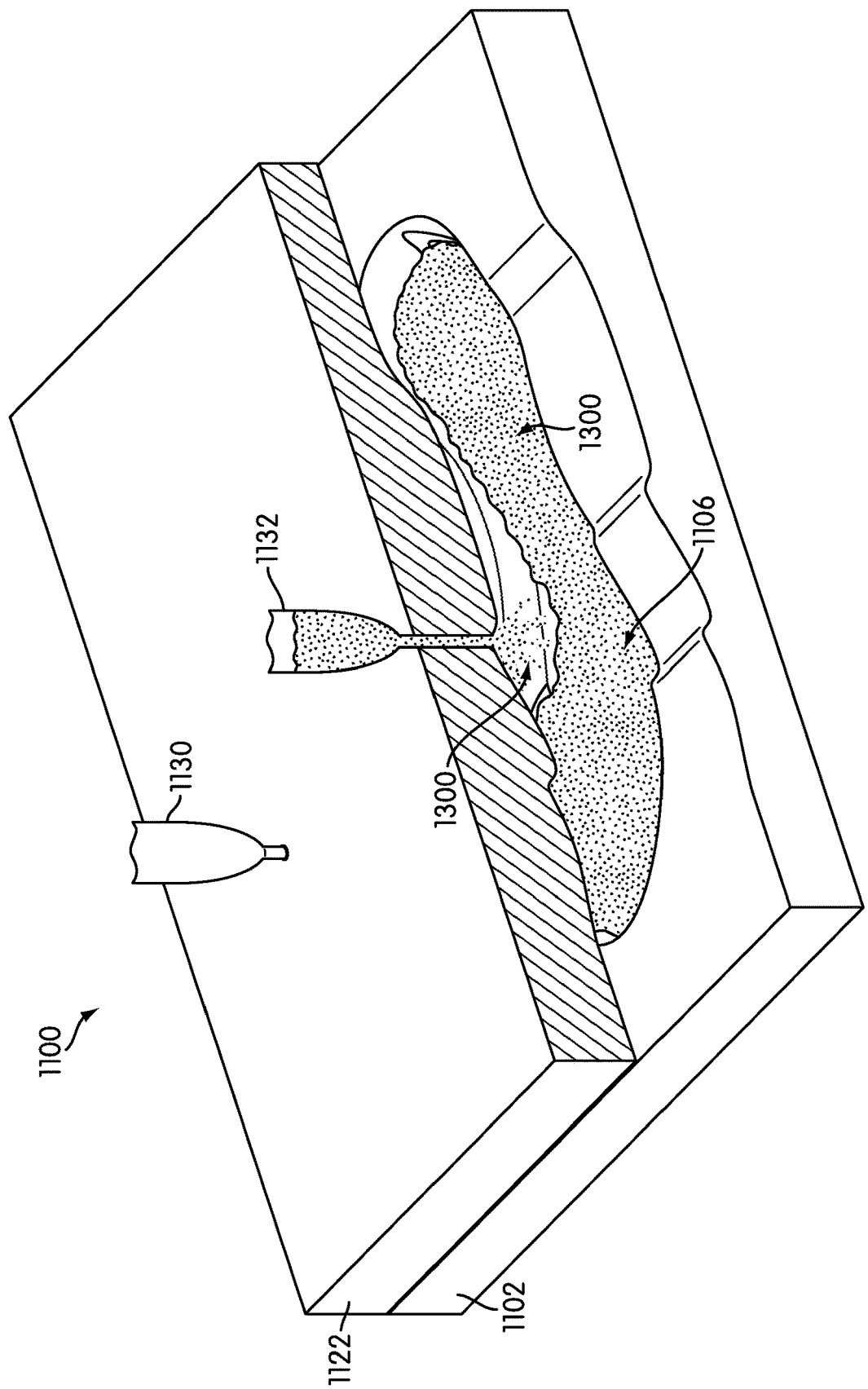
FIG. 17 is a schematic view with a partial cut-away view of an exemplary embodiment of a molding system for a cleated plate member being filled with molding material.

Referring now to FIG. 17, a schematic view with a partial cut-away view of an exemplary embodiment of molding system 1100 for a cleated plate member is illustrated being filled with molding material. In some embodiments molding system 1100 may include components configured to introduce molding material into first plate cavity 1104 and second plate cavity 1106. In an exemplary embodiment, molding system 1100 may include a molding top 1122. Molding top 1122 may be configured to align over molding base 1102. In some embodiments, molding top 1122 may be aligned over molding base 1102 using projections configured to correspond with guiding holes 1112 in molding base 1102, described above.

In some embodiments, molding top 1122 may include one ore more injection cavities configured to introduce molding material into plate cavities, including first plate cavity 1104 and/or second plate cavity 1106. In an exemplary embodiment, molding top 1122 may include a first injection cavity 1130 and a second injection cavity 1132. In one embodiment, first injection cavity 1130 and second injection cavity 1132 may each include an injection tip that protrudes from molding top 1122. In some embodiments, first injection cavity 1130 and second injection cavity 1132 may be in fluid communication with first plate cavity 1104 and second plate cavity 1106 in molding base 1102. In an exemplary embodiment, first injection cavity 1130 may be in fluid communication with first plate cavity 1104 via a first orifice and second injection cavity 1133 may be in fluid communication with second plate cavity 1106 via a second orifice. With this arrangement, each respective orifice may allow a liquid or viscous substance to pass through first injection cavity 1130 and/or second injection cavity 1132 into first plate cavity 1104 and/or second plate cavity 1106.

In the current embodiment illustrated in FIG. 17, two injection cavities with corresponding orifices are shown, one corresponding to each of first plate cavity 1104 and second plate cavity 1106. With this arrangement, molding material may be provided into first plate cavity 1104 and second plate cavity 1106. In other embodiments, however, molding system 1100 may include more or less injection cavities with corresponding orifices. Additionally, in other embodiments, the location and arrangement of injection cavities and corresponding orifices may vary from the configuration illustrated in FIG. 17.

As shown in FIG. 17, a molding material 1300 may be introduced into molding system 1100 through first injection cavity 1130 and/or second injection cavity 1132. As shown in the cut-away view, in this embodiment, molding material 1300 passes from second injection cavity 1132 through the second orifice and begins to fill second plate cavity 1106. In an exemplary embodiment, molding material 1300 fills in over the plurality of cleat assemblies 800 disposed within cleat assembly receptacles 1108 in second cavity plate 1106. As described above, in some embodiments, molding material 1300 may fill around each collar receptacle 810 portion of the plurality of cleat assemblies 800. With this arrangement, molding material 1300 substantially fills second plate cavity 1106 around collar receptacle 810 to embed collar receptacle 810 within the cleated plate member. In some embodiments, molding material 1300 also fills in plate body cavity portion 1110 to form the cleated plate member. While the molding process used to form a cleated plate member has been described with reference to second plate cavity 1106, it should be understood that a substantially similar process may be used to form a cleated plate member using first plate cavity 1104.

In some embodiments, molding material 1300 may be a plastic material. In different embodiments, however, various types of molding material 1300 may be used to form a cleated plate member using molding system 1100. In some embodiments, molding material 1300 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 1300. In addition, in some embodiments, a cleated plate member may be produced using more than one molding material 1300.

In some embodiments, molding material 1300 may be a compatible material with the material of collar receptacle 810. In an exemplary embodiment, molding material 1300 may bond with the material of collar receptacle 810 to securely attach collar receptacle 810 within the cleated plate member. Additionally, in some embodiments, molding material 1300 may be a non-compatible material with the material of cleat member 300. In an exemplary embodiment, molding material 1300 of the cleated plate member may be non-compatible with the molding material forming cleat member 300, including molding material 200 described above. With this arrangement, molding of the cleated plate member with a non-compatible material as cleat member 300, will allow a releasable attachment. As a result, cleat member 300 may be releasably attached to an outsole of an article.

In some embodiments, collar receptacle 810 may function as a barrier between the material of cleated plate member and cleat member 300. With this arrangement, the non-compatible material used to form collar receptacle 810 allows cleat member 300 to be releasably attached to cleated plate member. In an exemplary embodiment, portions of collar receptacle 810 may be sized and dimensioned so as to form a physical barrier between the material of the cleated plate member and the material of cleat member 300. For example, in one embodiment, girdle 814 of collar receptacle 810 may be a substantially similar diameter as shoulder 310 of cleat member 300. With this arrangement, molding material 1300 forming cleated plate member may be prevented from contacting cleat member 300.

In other embodiments, agents may be added to molding material 1300 and/or sprayed on portions of cleat member 300, including fastener element 302 and/or shoulder 310, prior to and/or during injection of molding material 1300 to further ensure non-compatibility between cleat member 300 and the cleated plate member. In addition, other known techniques may be used to prevent bonding between the materials of cleat member 300 and the cleated plate member.

Figure 18:
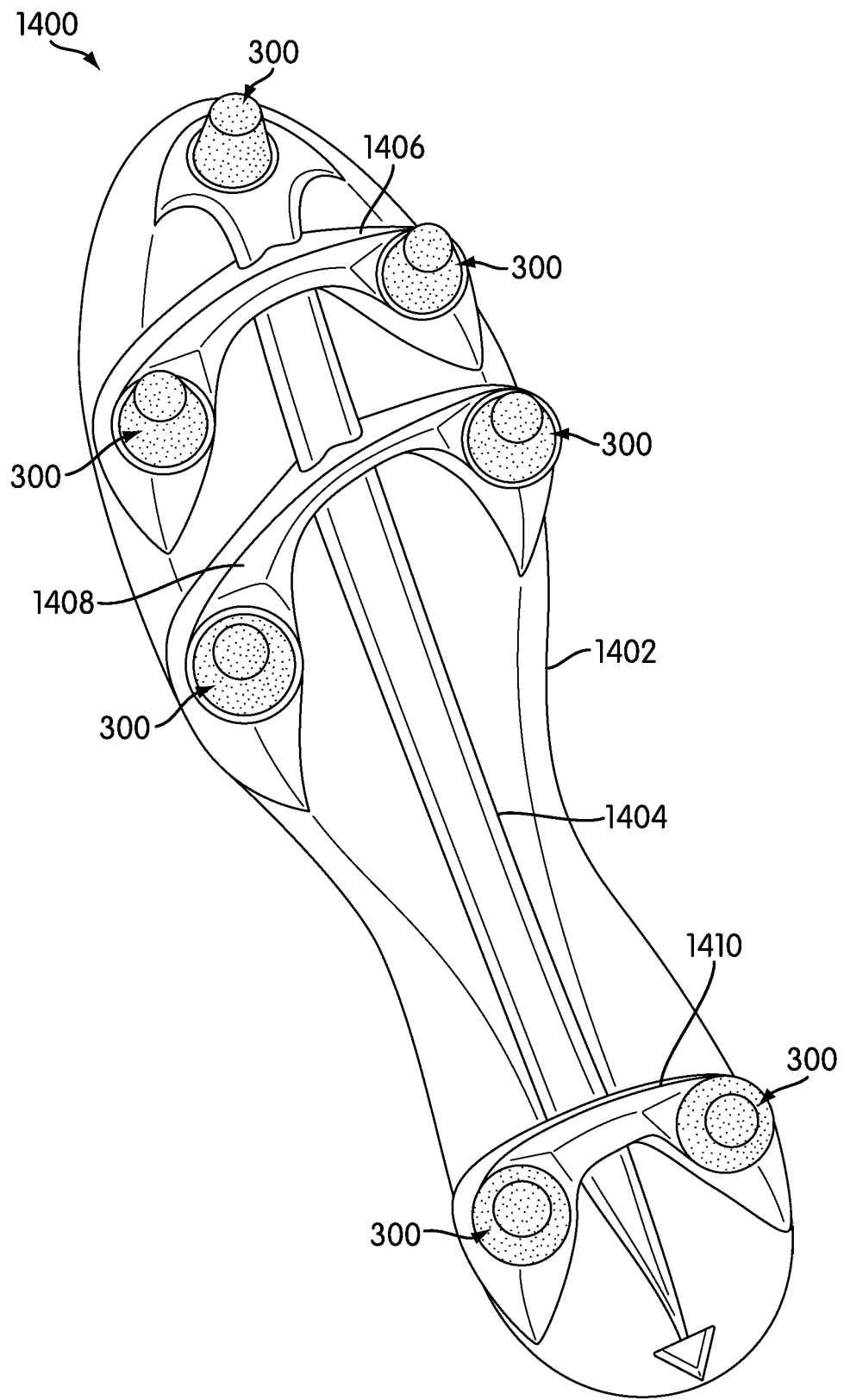
FIG. 18 is an isometric view of an exemplary embodiment of a cleated plate member.

Referring now to FIG. 18, an isometric view of an exemplary embodiment of a cleated plate member 1400 formed using molding system 1100 is illustrated. In some embodiments, cleated plate member 1400 may be formed using molding system 1100, as described above. In an exemplary embodiment, cleated plate member 1400 may include a plurality of cleat members 300. In one embodiment, cleated plate member 1400 may be produced, as described above, using cleat assemblies 800, including collar receptacle 810 and cleat member 300. In some embodiments, cleated plate member 1400 may be produced that includes releasable cleat members 300 already attached to cleated plate member 1400 via collar receptacle 810. With this arrangement, labor and equipment requirements associated with providing a separate process to insert cleat members into threads associated with cleated plate member 1400 may be reduced.

In some embodiments, cleated plate member 1400 may include one or more components to provide strength and/or stability to an outsole of an article of footwear. In an exemplary embodiment, cleated plate member 1400 may include a plate body 1402. Plate body 1402 may be produced from plate body cavity portion 1110 of first plate cavity 1104 and/or second plate cavity 1106, described above. In an exemplary embodiment, plate body 1402 comprises substantially a majority of cleated plate member 1400. Plate body 1402 may serve as an outsole for an article of footwear. In some embodiments, plate body 1402 may be made from a substantially rigid material. With this arrangement, plate body 1402 may provide stability and/or strength to cleated plate member 1400.

In some embodiments, cleated plate member 1400 may include optional additional components configured to increase stability and/or strength of cleated plate member 1400 and/or plate body 1402. In an exemplary embodiment, cleated plate member 1400 may include one or more support ribs extending along a transverse and/or longitudinal direction of cleated plate member 1400. In one embodiment, cleated plate member 1400 may include a central rib 1404. In some embodiments, central rib 1404 may extend longitudinally along substantially the center of cleated plate member 1400. In this embodiment, central rib 1404 extends substantially from a forefoot region to a heel region of cleated plate member 1400. In other embodiments, however, central rib 1404 may extend through one or more regions of cleated plate member 1400, including, but not limited to one or more of a forefoot region, a midfoot region, and/or a heel region. In still other embodiments, central rib 1404 may be optional and may not be provided on cleated plate member.

In another embodiment, cleated plate member 1400 may include one or more optional transverse support ribs. In this embodiment, cleated plate member 1400 includes a first transverse rib 1406 and a second transverse rib 1408 associated with a forefoot region of cleated plate member 1400. Similarly, cleated plate member 1400 may also include a third transverse rib 1410 associated with a heel region of cleated plate member 1400. In some embodiments, transverse support ribs, including first transverse rib 1406, second transverse rib, and/or third transverse rib 1410 may provide additional support and stability to portions of cleated plate member 1400. With this arrangement, cleated plate member 1400 may be limited from flexing in a transverse direction. Additionally, in some embodiments, the arrangement of first transverse rib 1406, second transverse rib, and/or third transverse rib 1410 on cleated plate member 1400 may correspond to the location of one or more cleat members 300.

In some embodiments, each of first transverse rib 1406, second transverse rib, and/or third transverse rib 1410 may extend laterally along substantially the entire width of cleated plate member 1400. In this embodiment, each of first transverse rib 1406, second transverse rib, and/or third transverse rib 1410 extends substantially from a lateral side to a medial side of cleated plate member 1400. In other embodiments, however, each of first transverse rib 1406, second transverse rib, and/or third transverse rib 1410 may extend through less than the entire width of cleated plate member 1400. Additionally, in other embodiments, more or less transverse ribs may be provided on cleated plate member 1400 including, but not limited to one or more of a forefoot region, a midfoot region, and/or a heel region. In still other embodiments, first transverse rib 1406, second transverse rib, and/or third transverse rib 1410 may be optional and may not be provided on cleated plate member.

Figure 19:
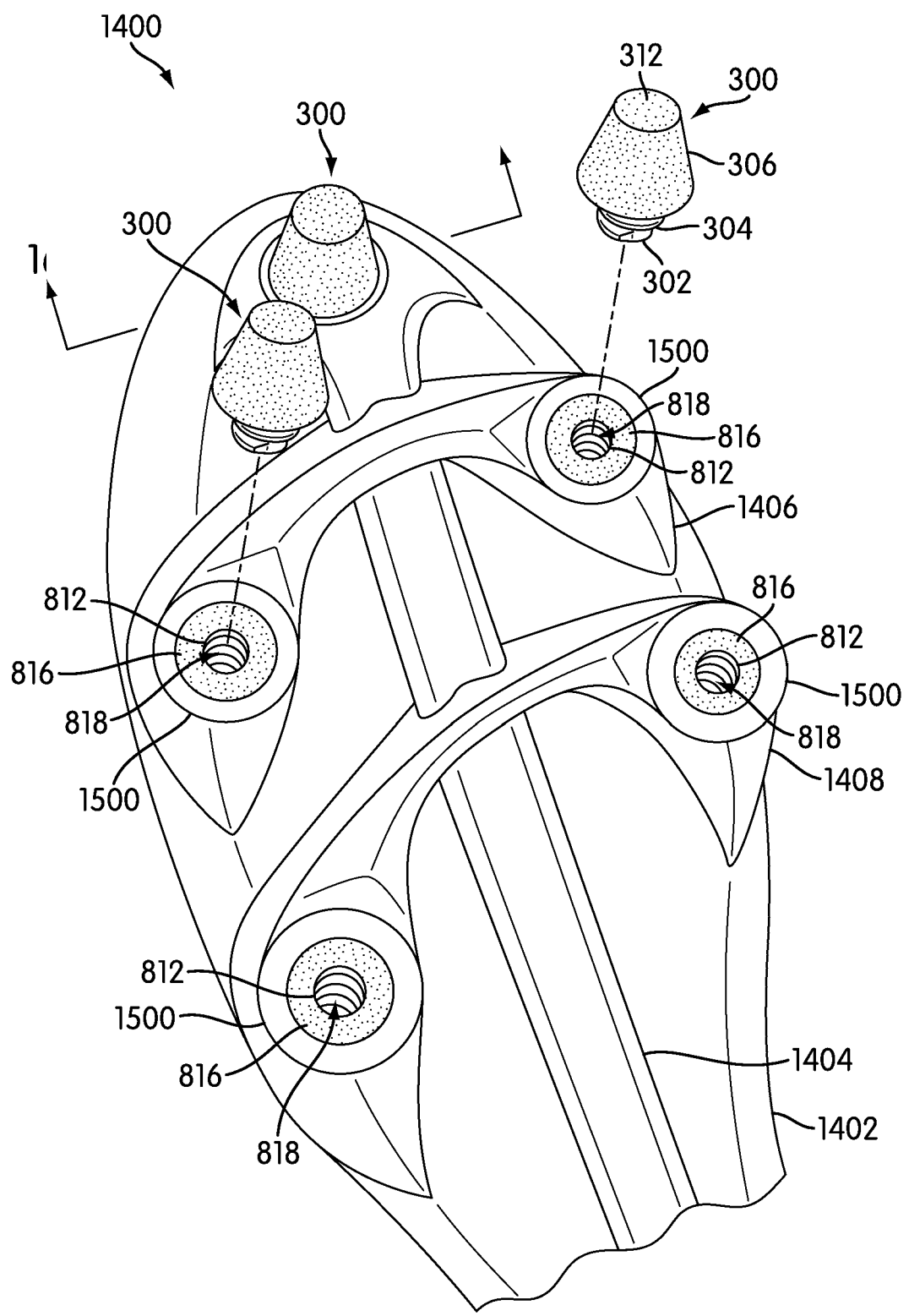
FIG. 19 is an enlarged view of an exemplary embodiment of a cleated plate member including a plurality of cleat assemblies.

Referring now to FIG. 19, an enlarged view of a forefoot region of an exemplary embodiment of cleated plate member 1400 including a plurality of embedded cleat assemblies 800 is illustrated. In this embodiment, cleated plate member 1400 incorporates cleat assembly 800, including collar receptacle 810 and cleat member 300. As shown in FIG. 19, collar receptacle 810 of cleat assembly 800 may be embedded into cleated plate member 1400. In some embodiments, fastener element 302 of cleat member 300 may allow cleat member 300 to be removably attached to cleated plate member 1400. In this embodiment, thread 304 of fastener element 302 may be disposed through hole 812 in collar receptacle 810 to engage with fastener receiving portion 818.

In some embodiments, a seat portion 1500 of cleated plate member 1400 may be molded to sit flush with bottom surface 816 of collar receptacle 810. In an exemplary embodiment, seat portion 1500 and bottom surface 816 may provide a flat surface for shoulder 310 of cleat member 300 to rest against when cleat member 300 is fully tightened to cleated plate member 1400. In one embodiment, a plurality of seat portions 1500 may be disposed on cleated plate member 1400 at locations that substantially correspond to one or more transverse support ribs, including first transverse rib 1406 and/or second transverse rib 1408. In different embodiments, seat portions 1500 may be provided at various locations on cleated plate member 1400 to correspond with cleat members 300 locations. Additionally, the shape and configuration of seat portions 1500 may vary to correspond to different shapes of various types of cleat members. In other embodiments, seat portions 1500 may be optional and may not be provided.

Figure 20:
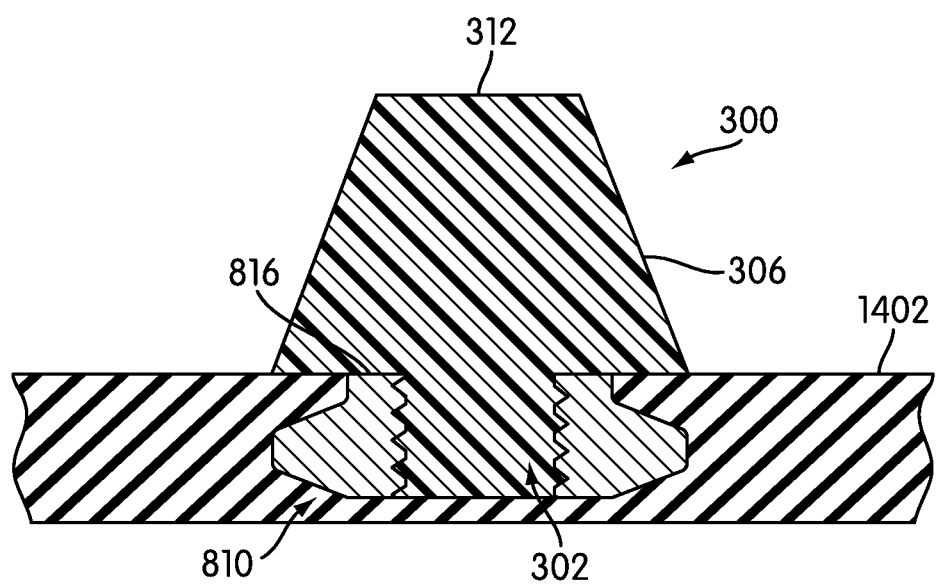
FIG. 20 is a cross-sectional view of an exemplary embodiment of a cleat assembly set within a cleated plate member.

FIG. 20 illustrates a cross-sectional view of exemplary embodiment of cleated plate member 1400 with an embedded cleat assembly 800, including cleat member 300 and collar receptacle 810. In this embodiment, plate body 1402 substantially surrounds collar receptacle 810 within cleated plate member 1400. With this arrangement, cleat member 300 may be releasably attached to cleated plate member 1400 by engaging fastener element 302 with corresponding fastener receiving portion 818 of collar receptacle 810. In an exemplary embodiment, cleat member 300 may be tightly screwed into collar receptacle 810 within plate body 1402. Additionally, this releasable attachment of cleat member 300 to cleated plate member 1400 may allow for replacement and/or customization of cleat members. For example, cleat members 300 may be removed to replace worn or broken cleat members and/or different types of cleat members may be used for various playing surfaces and/or conditions.

FIGS. 21 through 36 illustrate various alternate embodiments of portions of a cleat assembly, including alternate embodiments of a cleat member and a collar receptacle, that may be used with cleated plate member described herein. It should be understood that any combination of components may be used together to form different cleat assemblies, including combinations of various embodiments of cleat members and various embodiments of collar receptacles described herein, as well as other combinations not explicitly described.

Figure 21:
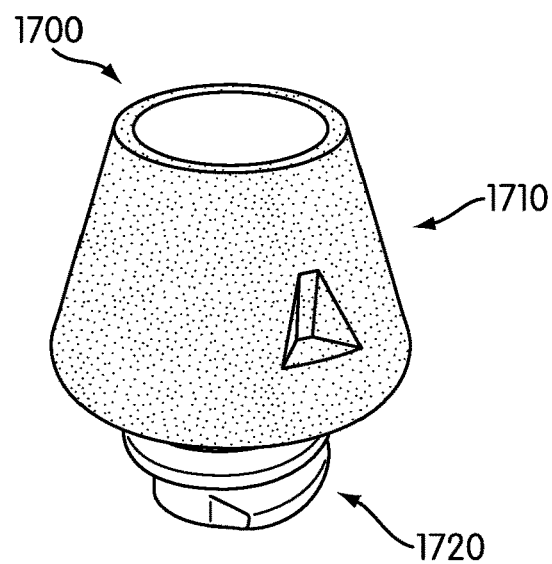
FIG. 21 is an isometric view of an alternate embodiment of a two-piece cleat member.

Referring now to FIG. 21, an isometric view of an alternate embodiment of a cleat member is illustrated. In some embodiments, a two-piece cleat member 1700 may be provided. In an exemplary embodiment, two-piece cleat member 1700 may include an outer shell portion 1710 and a central portion 1720. In some embodiments, outer shell portion 1710 may be associated with the outer body of two-piece cleat member 1700 and central portion 1720 may be associated with the fastener element and inner body of two-piece cleat member 1700. In one embodiment, outer shell portion 1710 and central portion 1720 may be made from different materials. In some cases, central portion 1720 may be made from a material that is harder or more durable than a material used to make outer shell portion 1710 to provide a stronger material for the fastener element of two-piece cleat member 1700. In other cases, outer shell portion 1710 may be made from a material that is softer or more deformable than the material used to make central portion 1720 to provide traction for two-piece cleat member 1700.

Figure 22:
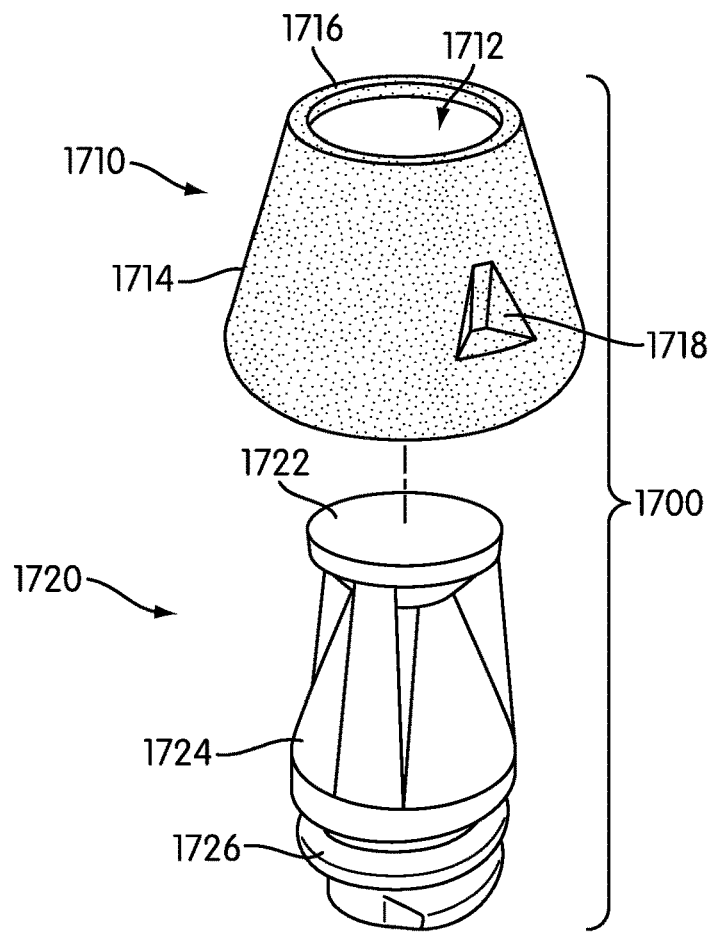
FIG. 22 is an exploded view of an alternate embodiment of a two-piece cleat member.

FIG. 22 illustrates an exploded view of two-piece cleat member 1700. In some embodiments, portions of two-piece cleat member 1700 may include a number of components associated with a one-piece cleat member, including cleat member 300, described above. In one embodiment, outer shell portion 1710 may include a body 1714. In some embodiments, body 1714 of two-piece cleat member 1700 may be configured in a particular shape. In some cases, a particular shape of body 1714 may be configured to provide traction for an article of footwear. In some embodiments, body 1714 may have a conical shape with a generally flat engaging surface located at the top of outer shell portion 1710. In this embodiment, outer shell portion 1710 may include a lip 1716 disposed along the outer perimeter of outer shell portion 1710 and a hole 1712. Hole 1712 may receive an engaging surface 1722 associated with central 1720. In other embodiments, body 1714 may have different shapes, including any shape described above in reference to body 306. Additionally, in some embodiments, body 1714 may include one or more recessed portions 1718. Recessed portions 1718 may be substantially similar in shaped and function as recessed portions 308, described above.

In some embodiments, central portion 1720 of two-piece cleat member 1700 may include a fastener element 1726. Fastener element 1726 may be configured to engage an article of footwear. In one embodiment, fastener element 1726 may include a thread to releasably attach two-piece cleat member 1700 to an outsole. In some embodiments, central portion 1720 may extend along a length of two-piece cleat member 1700. In this embodiment, central portion 1720 includes a barrel 1724. In an exemplary embodiment, barrel 1724 may be associated with a center of two-piece cleat member 1700. In one embodiment, outer shell portion 1710 may be disposed around the outside of barrel 1724 to form the body of two-piece cleat member 1700.

In some embodiments, central thread portion 1720 may include engaging surface 1722. In this embodiment, engaging surface 1722 is disposed opposite of fastener element 1726. In some cases, engaging surface 1722 may extend through hole 1712 in outer shell portion 1710. In addition, lip 1716 may extend around an outer perimeter of engaging surface 1722. In an exemplary embodiment, engaging surface 1722 may be provided to contact a ground surface and provide traction for an article of footwear.

FIGS. 23 through 26 illustrate an exemplary embodiment of a molding process for making two-piece cleat member 1700. It should be understood that the order of the steps illustrated is merely exemplary and the portions of two-piece cleat member 1700 may be made in a different order.

Figure 23:
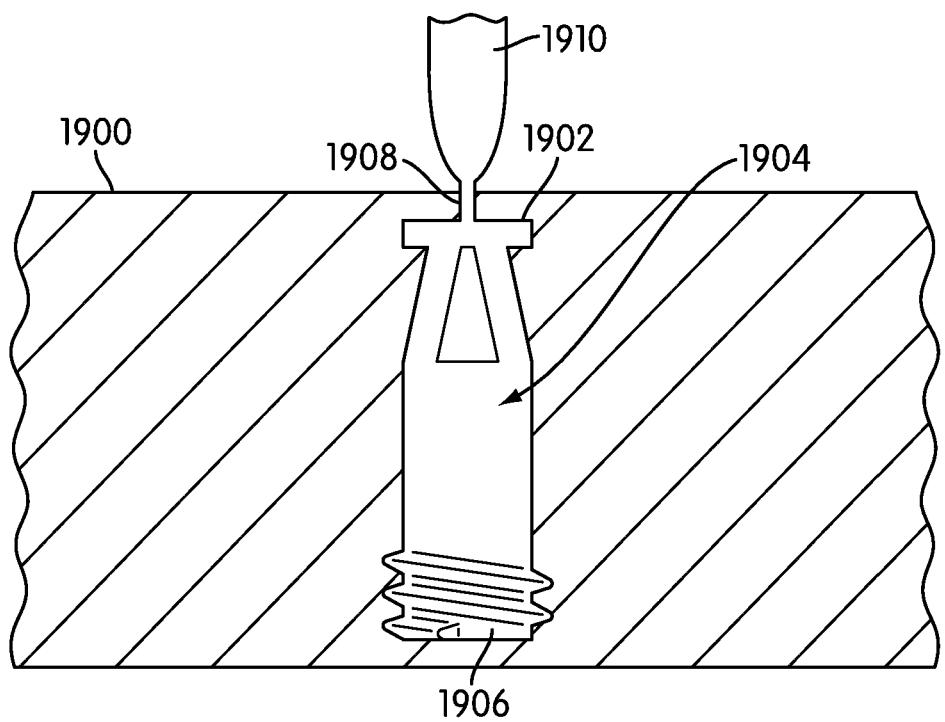
FIG. 23 is a schematic view of an alternate embodiment of a molding system for a central portion of a cleat member.

Referring now to FIG. 23, a schematic view of an alternate embodiment of a molding system 1900 that may be used to make central portion 1720 of two-piece cleat member 1700 is illustrated. In some embodiments, molding system 1900 may be an injection mold. Molding system 1900 may include one or more components typically associated with an injection mold, including components not described herein. In an exemplary embodiment, molding system 1900 may include a mold cavity 1902. In some embodiments, mold cavity 1902 may be sized and dimensioned so as to correspond to a shape associated with central portion 1720 of two-piece cleat member 1700.

In some embodiments, mold cavity 1902 may include one or more portions configured to correspond to different portions of central portion 1720. In an exemplary embodiment, mold cavity 1902 may include a barrel cavity portion 1904. In an exemplary embodiment, barrel cavity portion 1904 may correspond to barrel 1724 of central portion 1720. In an exemplary embodiment, barrel cavity portion 1904 may correspond to a substantially cylindrical shaped central portion 1720. In other embodiments, barrel cavity portion 1904 may correspond to different shapes associated with a cleat member body, including but not limited to hexagonal, cylindrical, conical, circular, square, rectangular, trapezoidal, diamond, ovoid, as well as other regular or irregular and geometric or non-geometric shapes.

In some embodiments, mold cavity 1902 may also include a fastener cavity portion 1906. In an exemplary embodiment, fastener cavity portion 1906 may correspond to fastener element 1726 of central portion 1720. In some cases, fastener element 1726 of central portion 1720 may be provided to attach two-piece cleat member 1700 to an outsole. In particular, fastener element 1726 may be configured to releasably attach central portion 1720 to an outsole. In an exemplary embodiment, fastener cavity portion 1906 may be configured to include a plurality of grooves configured to correspond to thread elements associated with fastener element 1726. With this arrangement, two-piece cleat member 1700 may be screwed into a corresponding fastener receiving portion in a bottom surface of an outsole.

In some embodiments, molding system 1900 may also include components configured to introduce material used for molding into mold cavity 1902. In an exemplary embodiment, molding system 1900 may include an injection cavity 1910. In one embodiment, injection cavity 1910 may include an injection tip that protrudes from molding system 1900. In some embodiments, injection cavity 1910 may be in fluid communication with mold cavity 1902 via an orifice 1908. With this arrangement, orifice 1908 allows a liquid or viscous substance to pass through injection cavity 1910 into mold cavity 1902. In FIG. 23, only one injection cavity and orifice are shown, in other embodiments, however, molding system 1900 may include additional injection cavities with corresponding orifices.

Figure 24:
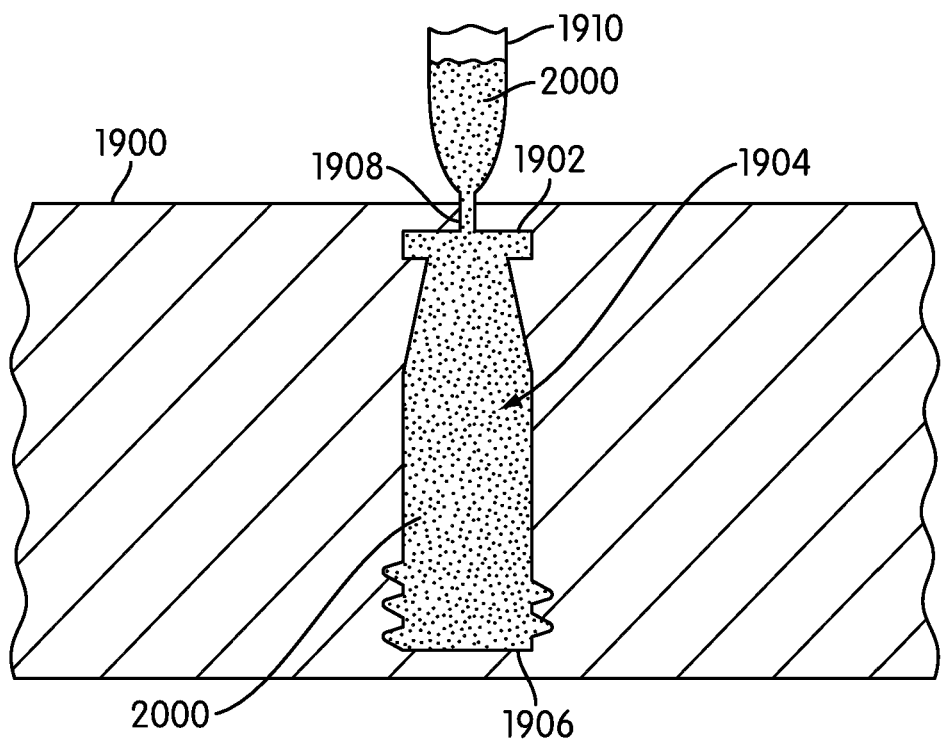
FIG. 24 is a schematic view of an alternate embodiment of a molding system for a central portion of a cleat member being filled with molding material.

Referring to FIG. 24, a schematic view of an exemplary embodiment of molding system 1900 for making central portion 1720 of two-piece cleat member 1700 is illustrated being filled with molding material 2000. In an exemplary embodiment, molding material 2000 may be a thermoplastic polyurethane (TPU) material. In different embodiments, however, various types of molding material 2000 may be used to form central portion 1720 of two-piece cleat member 1700 using molding system 1900. In some embodiments, molding material 2000 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 2000. In addition, in some embodiments, central portion 1720 of two-piece cleat member 1700 may be produced using more than one molding material 2000.

As shown in FIG. 24, molding material 2000 may be introduced into molding system 1900 through injection cavity 1910. In this embodiment, molding material 2000 passes through orifice 1908 into mold cavity 1902 and begins to fill fastener cavity portion 1906 and barrel cavity portion 1904. In an exemplary embodiment, molding material 2000 substantially fills mold cavity 1902 to form central portion 1720.

Figure 25:
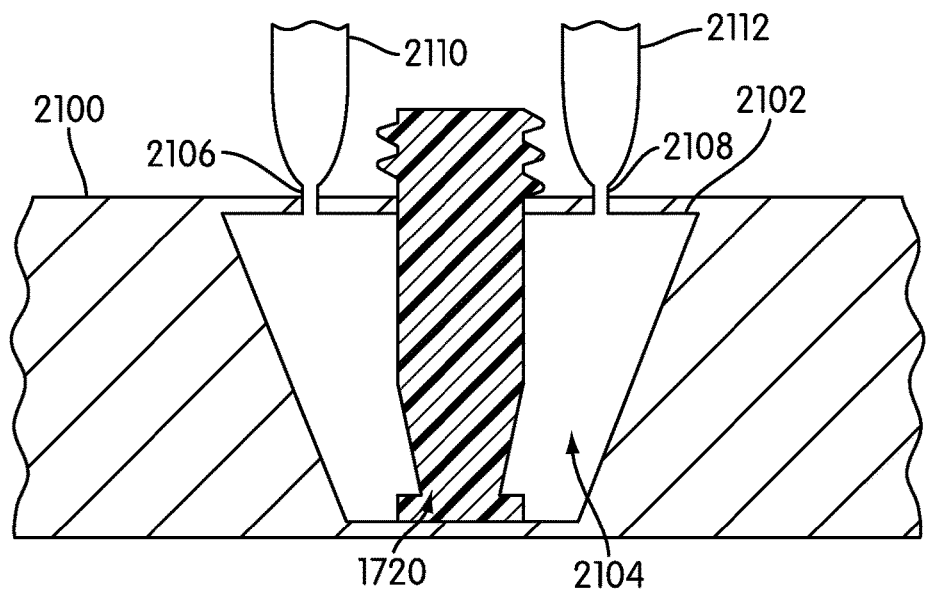
FIG. 25 is a schematic view of an alternate embodiment of a molding system for an outer shell portion of a cleat member.
Figure 26:
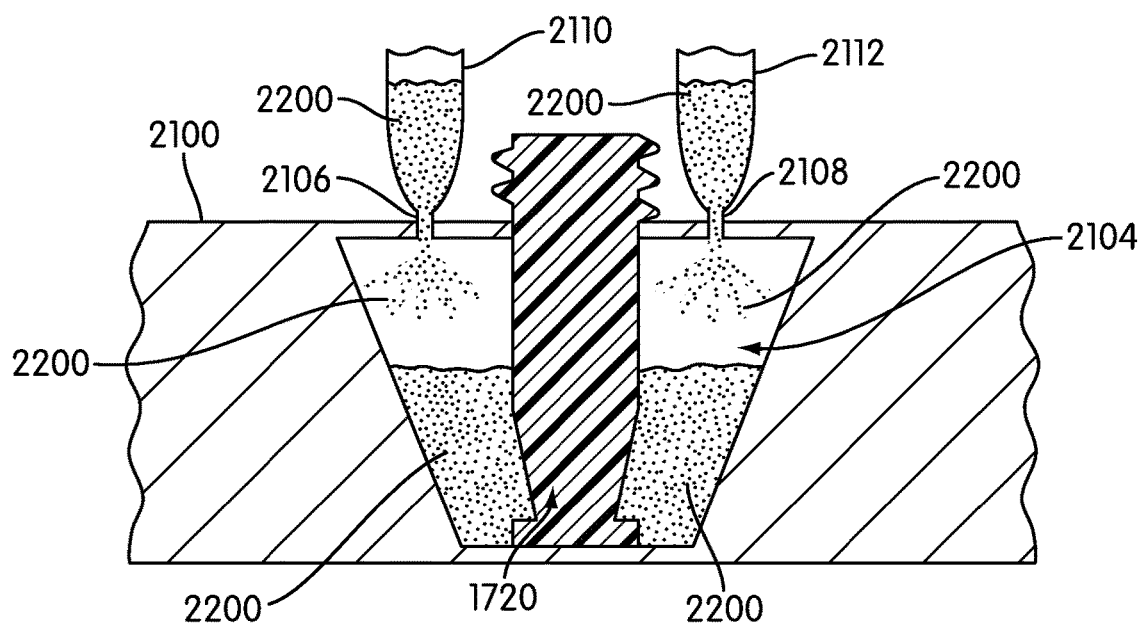
FIG. 26 is a schematic view of an alternate embodiment of a molding system for an outer shell portion of a cleat member being filled with molding material.

FIGS. 25 and 26 illustrate an exemplary embodiment of a molding system 2100 for molding outer shell portion 1710 of two-piece cleat member 1700. Referring now to FIG. 25, a schematic view of an alternate embodiment of molding system 2100 for outer shell portion 1710 of two-piece cleat member 1700 is illustrated. In some embodiments, two-piece cleat member 1700 may be made by molding outer shell portion 1710 with central portion 1720. In an exemplary embodiment, central portion 1720 may be used as part of molding system 2100. In one embodiment, molding system 2100 may be used to manufacture outer shell portion 1710 over central portion 1720 to form two-piece cleat member 1700.

In some embodiments, molding system 2100 may include one or more components typically associated with an injection mold, including components not described herein. For example, in some embodiments, molding system 2100 may include a number of pins, including retractable pins that may be used to hold central portion 1720 in position within molding system 2100. In an exemplary embodiment, molding system 2100 may include a cavity 2102. In some embodiments, cavity 2102 may be sized and dimensioned so as to correspond to a shape associated with outer shell portion 1710 and the body of two-piece cleat member 1700. Molding system 2100 may be configured to make an outer shell portion for a two-piece cleat member of any type, shape, or configuration.

In some embodiments, cavity 2102 may include one or more portions configured to correspond to different portions of outer shell portion 1710. In an exemplary embodiment, cavity 2102 may include a body shell cavity portion 2104. In one embodiment, body shell cavity portion 2104 may correspond to outer shell portion 1710. In some embodiments, cavity 2102 may also include a majority of central portion 1720, except fastener element 1726. In an exemplary embodiment, cavity 2102 may be used to form an outer body around barrel 1724 of central portion 1720.

In some embodiments, molding system 2100 may also include components configured to introduce molding material into cavity 2102. In an exemplary embodiment, molding system 2100 may include a first injection cavity 2110 and a second injection cavity 2112. In one embodiment, first injection cavity 2110 and second injection cavity 2112 may each include an injection tip that protrudes from molding system 2100. In some embodiments, first injection cavity 2110 and second injection cavity 2112 may be in fluid communication with cavity 2102. In an exemplary embodiment, first injection cavity 2110 may be in fluid communication with cavity 2102 via a first orifice 2106 and second injection cavity 2112 may be in fluid communication with cavity 2102 via a second orifice 2108. With this arrangement, first orifice 2106 and/or second orifice 2108 allow a liquid or viscous substance to pass through first injection cavity 2110 and/or second injection cavity 2112 into cavity 2102.

In the current embodiment illustrated in FIG. 25, two injection cavities with corresponding orifices are shown, one on each side of cavity 2102. With this arrangement, molding material may be provided substantially uniform around central portion 1720. In other embodiments, however, molding system 2100 may include more or less injection cavities with corresponding orifices. Additionally, in other embodiments, the location and arrangement of injection cavities and corresponding orifices may vary.

Referring to FIG. 26, a schematic view of molding system 2100 is illustrated being filled with molding material 2200 for making outer shell portion 1710 of two-piece cleat member 1700. In an exemplary embodiment, molding material 2200 may be a thermoplastic polyurethane (TPU) material. In one embodiment, molding material 2200 may be a clear or semi-transparent material. With this arrangement, central portion 1720 may be visible within outer shell portion 1710. In different embodiments, however, various types of molding material 2200 may be used to form outer shell portion 1710 using molding system 2100. In some embodiments, molding material 2200 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 2200. In addition, in some embodiments, outer shell portion 1710 may be produced using more than one molding material 2200.

FIGS. 27 through 32 illustrate alternate embodiments of molding processes for making a cleat assembly with a two-piece cleat member and a collar receptacle. In some cases, the order of molding the components of a cleat assembly, as well as the choice of molding system, may be chosen based on various characteristics, including but not limited to one or more of: the molding materials chosen for each component, the hardness or durability of the component, the temperature of molding material, as well as other considerations. It should be understood that the order of the steps illustrated is merely exemplary and the components of the cleat assembly may be made in a different order.

Figure 27:
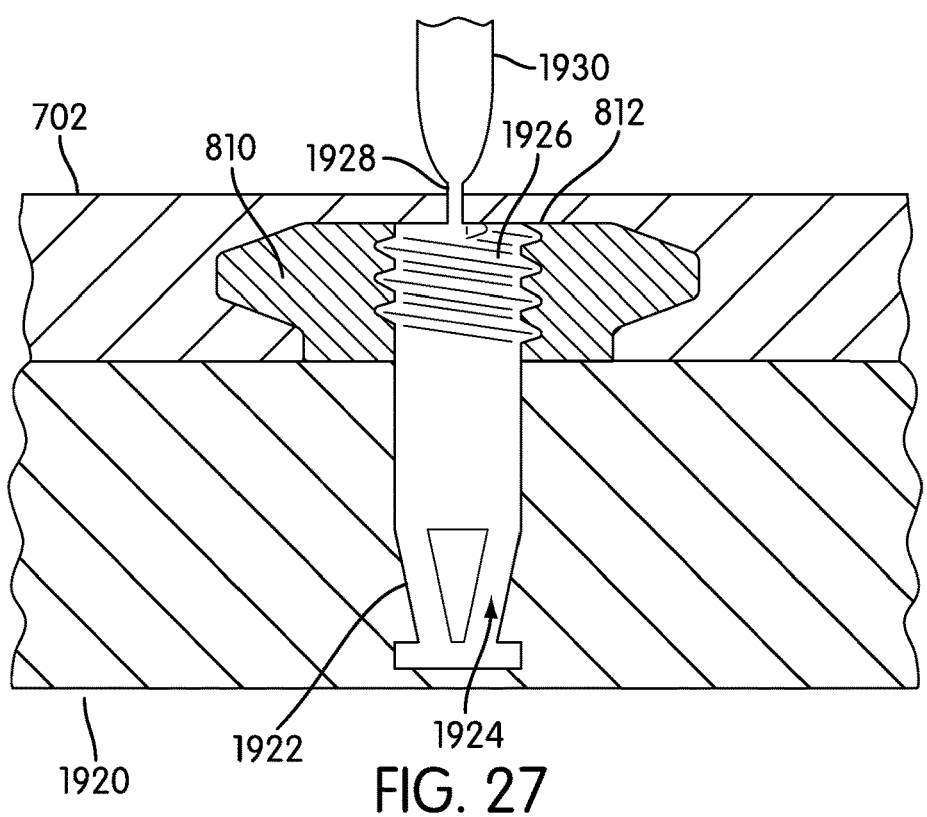
FIG. 27 is a schematic view of an alternate embodiment of a molding system for a central portion of a cleat member.

Referring now to FIG. 27, a schematic view of an alternate embodiment of a molding system for a two-piece cleat member is illustrated. In some embodiments, a multi-part molding system may be used to make a two-piece cleat member using one or more pre-formed components. In an exemplary embodiment, a multi-part molding system may use a pre-formed collar receptacle and a through molding system to make a two-piece cleat member. In one embodiment, a multi-part molding system may include molding system 702 and a through molding system 1920. In some embodiments, molding system 702 may include a collar receptacle 810 that has been formed using the process described above. In this embodiment, through molding system 1920 may be used together with collar receptacle 810 to make a two-piece cleat member. In one embodiment, through molding system 1920 may be used to manufacture a two-piece cleat member that includes a fastener element that corresponds to the fastener receiving portion of collar receptacle 810. With this arrangement, a close fit may be provided between a two-piece cleat member and a collar receptacle.

In some embodiments, through molding system 1920 may be an injection mold. Through molding system 1920 may include one or more components typically associated with an injection mold, including components not described herein. In an exemplary embodiment, through molding system 1920 may include a mold cavity 1922. In some embodiments, mold cavity 1922 may be sized and dimensioned so as to correspond to a shape associated with central portion 1720 of two-piece cleat member 1700.

In some embodiments, mold cavity 1922 may include one or more portions configured to correspond to different portions of central portion 1720. In an exemplary embodiment, mold cavity 1922 may include a barrel cavity portion 1924. In an exemplary embodiment, barrel cavity portion 1924 may correspond to barrel 1724 of central portion 1720. In an exemplary embodiment, barrel cavity portion 1924 may correspond to a substantially cylindrical shaped central portion 1720. In other embodiments, barrel cavity portion 1924 may correspond to different shapes associated with a cleat member body, including but not limited to hexagonal, cylindrical, conical, circular, square, rectangular, trapezoidal, diamond, ovoid, as well as other regular or irregular and geometric or non-geometric shapes.

In some embodiments, mold cavity 1922 may also include a fastener cavity portion 1926. In this embodiment, fastener cavity portion 1926 corresponds to a hole 812 within collar receptacle 810 that includes the fastener receiving portion. In an exemplary embodiment, fastener cavity portion 1926 may correspond to fastener element 1726 of central portion 1720. In some cases, fastener element 1726 of central portion 1720 may be provided to attach two-piece cleat member 1700 to collar receptacle 810. In particular, fastener element 1726 may be configured to releasably attach central portion 1720 to an outsole including collar receptacle 810. In an exemplary embodiment, fastener cavity portion 1926 may be configured to include a plurality of grooves configured to correspond to thread elements associated with fastener element 1726. With this arrangement, two-piece cleat member 1700 may be screwed into a corresponding fastener receiving portion in collar receptacle 810.

In some embodiments, through molding system 1920 may also include components configured to introduce material used for molding into mold cavity 1922. In an exemplary embodiment, through molding system 1920 may include an injection cavity 1930. In one embodiment, injection cavity 1930 may include an injection tip that protrudes from molding system 1920. In some embodiments, injection cavity 1930 may be in fluid communication with mold cavity 1922 via an orifice 1928 and through hole 812 of collar receptacle 810. With this arrangement, orifice 1928 allows a liquid or viscous substance to pass through injection cavity 1930 and hole 812 into mold cavity 1922. In FIG. 27, only one injection cavity and orifice are shown, in other embodiments, however, through molding system 1920 may include additional injection cavities with corresponding orifices.

Figure 28:
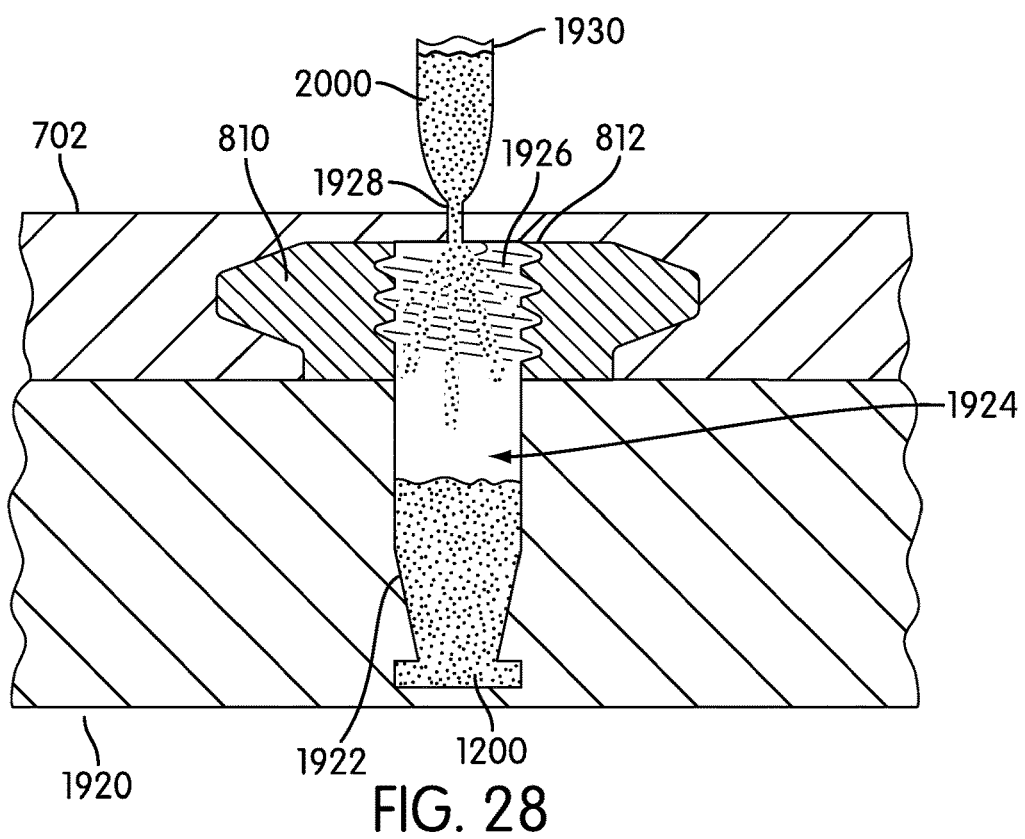
FIG. 28 is a schematic view of an alternate embodiment of a molding system for a central portion of a cleat member being filled with molding material.

Referring to FIG. 28, a schematic view of an exemplary embodiment of through molding system 1920 for making central portion 1720 of two-piece cleat member 1700 is illustrated being filled with molding material 2000. In an exemplary embodiment, molding material 2000 may be a thermoplastic polyurethane (TPU) material. In different embodiments, however, various types of molding material 2000 may be used to form central portion 1720 of two-piece cleat member 1700 using through molding system 1920. In some embodiments, molding material 2000 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 2000. In addition, in some embodiments, central portion 1720 of two-piece cleat member 1700 may be produced using more than one molding material 2000. In an exemplary embodiment, molding material 2000 may be a non-compatible material with the material of collar receptacle 810, including molding material 700, as described above.

As shown in FIG. 28, molding material 2000 may be introduced into through molding system 1920 through injection cavity 1930 and through hole 812 of collar receptacle 810. In this embodiment, molding material 2000 passes through orifice 1908 and hole 812 into mold cavity 1922 and begins to fill barrel cavity portion 1924 and fastener cavity portion 1926. In an exemplary embodiment, molding material 2000 substantially fills mold cavity 1922 to form central portion 1720.

Figure 29:
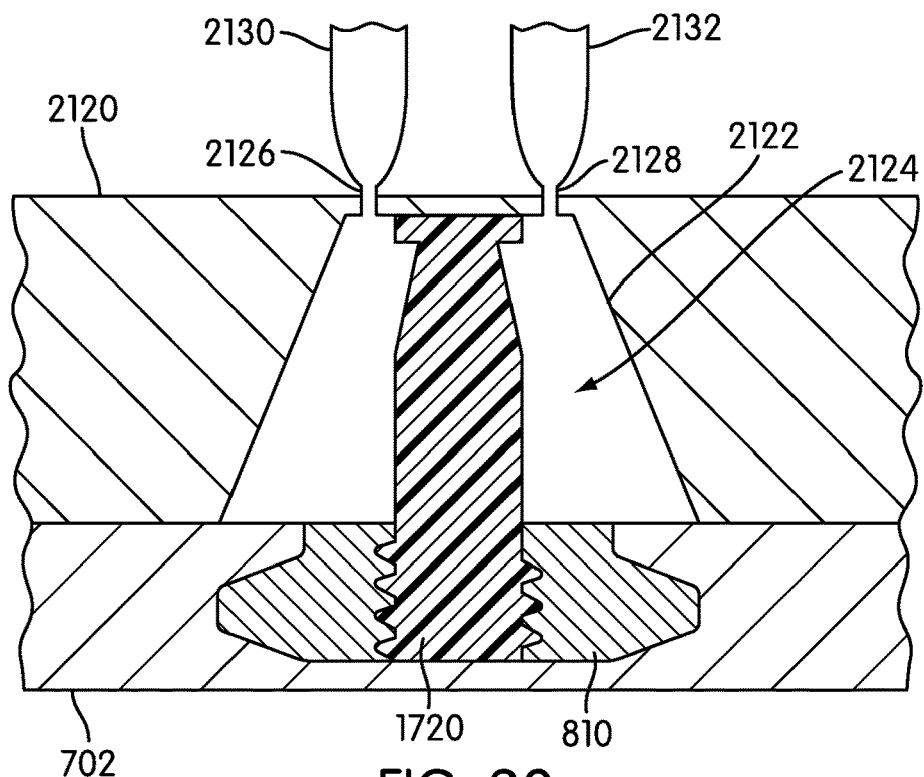
FIG. 29 is a schematic view of an alternate embodiment of a molding system for an outer shell portion of a cleat member.
Figure 30:
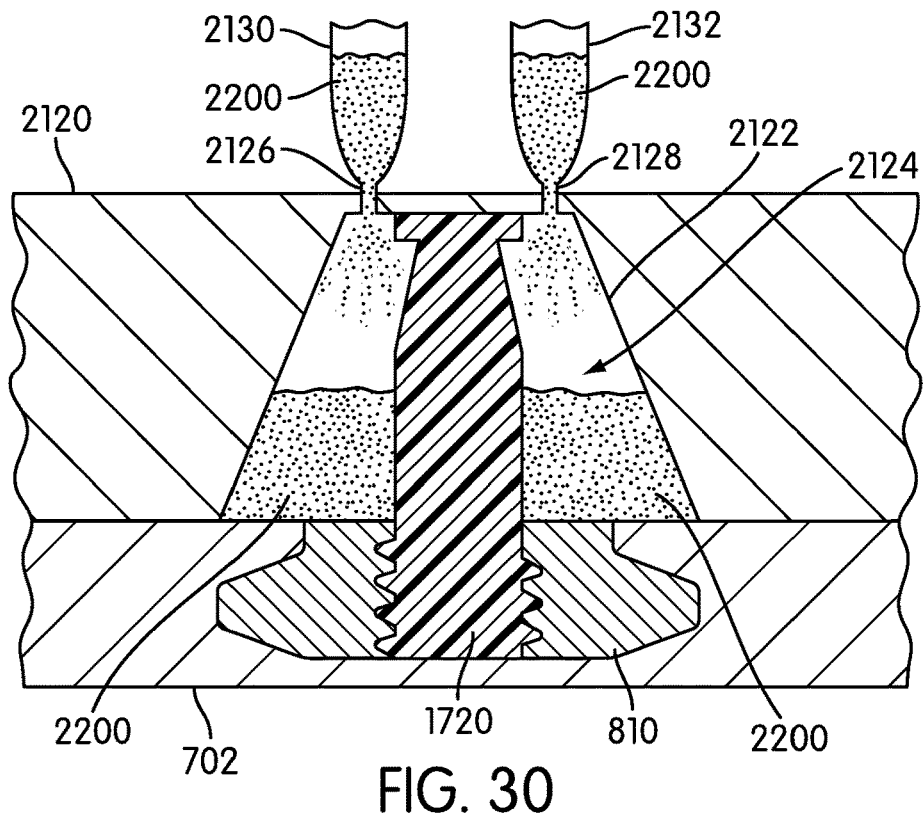
FIG. 30 is a schematic view of an alternate embodiment of a molding system for an outer shell portion of a cleat member being filled with molding material.

FIGS. 29 and 30 illustrate an exemplary embodiment of a molding system 2120 for molding outer shell portion 1710 of two-piece cleat member 1700. In some embodiments, molding system 2120 may be used with one or more molding systems, including pre-formed components, as described above. In one embodiment, molding system 2120 may be used with molding system 702 that includes pre-formed collar receptacle 810 and/or pre-formed central portion 1720, molded using a molding process as described above.

Referring now to FIG. 29, a schematic view of an alternate embodiment of molding system 2120 for outer shell portion 1710 of two-piece cleat member 1700 is illustrated. In some embodiments, two-piece cleat member 1700 may be made by molding outer shell portion 1710 with central portion 1720. In an exemplary embodiment, central portion 1720 may be used as part of molding system 2120. In one embodiment, molding system 2120 may be used to manufacture outer shell portion 1710 over central portion 1720 to form two-piece cleat member 1700.

In some embodiments, molding system 2120 may include one or more components typically associated with an injection mold, including components not described herein. In an exemplary embodiment, molding system 2120 may include a cavity 2122. In some embodiments, cavity 2122 may be sized and dimensioned so as to correspond to a shape associated with outer shell portion 1710 and the body of two-piece cleat member 1700. Molding system 2120 may be configured to make an outer shell portion for a two-piece cleat member of any type, shape, or configuration.

In some embodiments, cavity 2122 may include one or more portions configured to correspond to different portions of outer shell portion 1710. In an exemplary embodiment, cavity 2122 may include a body shell cavity portion 2124. In one embodiment, body shell cavity portion 2124 may correspond to outer shell portion 1710. In some embodiments, cavity 2122 may also include a majority of central portion 1720, except fastener element 1726. In an exemplary embodiment, cavity 2122 may be used to form an outer body around barrel 1724 of central portion 1720.

In some embodiments, molding system 2120 may also include components configured to introduce molding material into cavity 2122. In an exemplary embodiment, molding system 2120 may include a first injection cavity 2130 and a second injection cavity 2132. In one embodiment, first injection cavity 2130 and second injection cavity 2132 may each include an injection tip that protrudes from molding system 2120. In some embodiments, first injection cavity 2130 and second injection cavity 2132 may be in fluid communication with cavity 2122. In an exemplary embodiment, first injection cavity 2130 may be in fluid communication with cavity 2122 via a first orifice 2126 and second injection cavity 2132 may be in fluid communication with cavity 2122 via a second orifice 2128. With this arrangement, first orifice 2126 and/or second orifice 2128 allow a liquid or viscous substance to pass through first injection cavity 2130 and/or second injection cavity 2132 into cavity 2122.

In the current embodiment illustrated in FIG. 29, two injection cavities with corresponding orifices are shown, one on each side of cavity 2122. With this arrangement, molding material may be provided substantially uniform around central portion 1720. In other embodiments, however, molding system 2120 may include more or less injection cavities with corresponding orifices. Additionally, in other embodiments, the location and arrangement of injection cavities and corresponding orifices may vary.

Referring to FIG. 30, a schematic view of molding system 2120 is illustrated being filled with molding material 2200 for making outer shell portion 1710 of two-piece cleat member 1700. In an exemplary embodiment, molding material 2200 may be a thermoplastic polyurethane (TPU) material. In one embodiment, molding material 2200 may be a clear or semi-transparent material. With this arrangement, central portion 1720 may be visible within outer shell portion 1710. In different embodiments, however, various types of molding material 2200 may be used to form outer shell portion 1710 using molding system 2120. In some embodiments, molding material 2200 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 2200. In addition, in some embodiments, outer shell portion 1710 may be produced using more than one molding material 2200.

Figure 31:
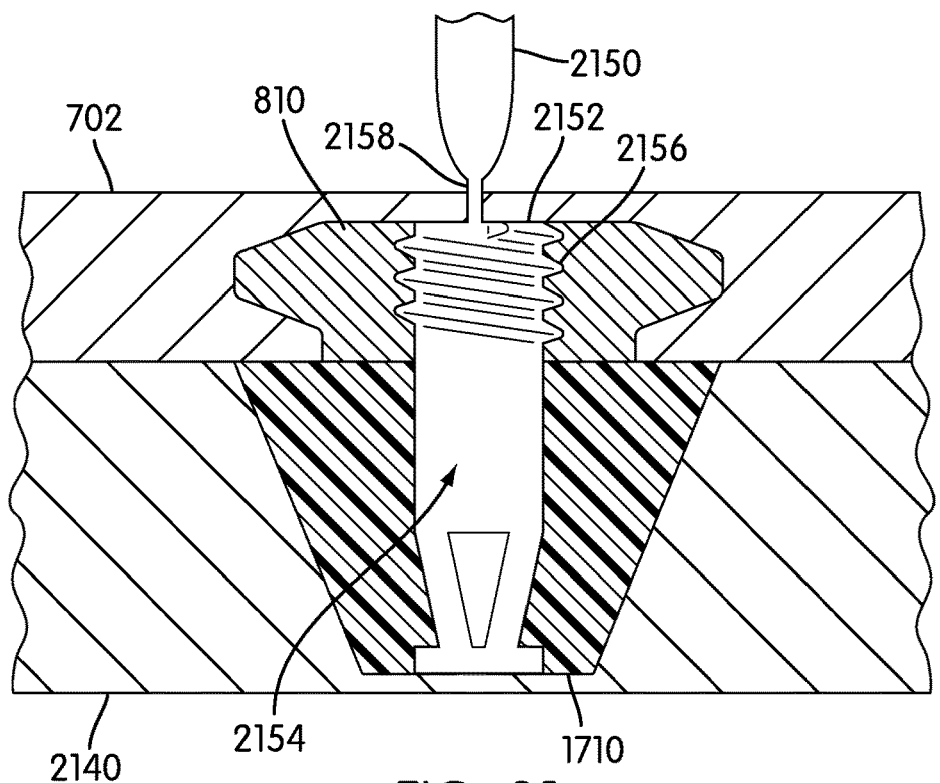
FIG. 31 is a schematic view of an alternate embodiment of a molding system for a central portion of a cleat member.

Referring now to FIG. 31, a schematic view of an alternate embodiment of a molding system for a two-piece cleat member is illustrated. In some embodiments, a multi-part molding system may be used to make a two-piece cleat member using one or more pre-formed components. In an exemplary embodiment, a multi-part molding system may use a pre-formed collar receptacle and a pre-formed outer shell portion together with a through molding system to make a two-piece cleat member. In one embodiment, a multi-part molding system may include molding system 702 and a through molding system 2140. In some embodiments, molding system 702 may include a collar receptacle 810 that has been formed using the process described above. In this embodiment, through molding system 2140 may be used together with collar receptacle 810 and outer shell portion 1710 to make a two-piece cleat member. In one embodiment, through molding system 2140 may be used to make central portion 1720 of two-piece cleat member 1700. With this arrangement, through molding system 2140 may be used to manufacture a two-piece cleat member that includes a fastener element that corresponds to the fastener receiving portion of collar receptacle 810. With this arrangement, a close fit may be provided between a two-piece cleat member and a collar receptacle.

In some embodiments, through molding system 2140 may be an injection mold. Through molding system 2140 may include one or more components typically associated with an injection mold, including components not described herein. In an exemplary embodiment, through molding system 2140 may include a mold cavity 2152. In some embodiments, mold cavity 2152 may be sized and dimensioned so as to correspond to a shape associated with central portion 1720 of two-piece cleat member 1700.

In some embodiments, mold cavity 2152 may include one or more portions configured to correspond to different portions of central portion 1720. In an exemplary embodiment, mold cavity 2152 may include a barrel cavity portion 2154. In an exemplary embodiment, barrel cavity portion 2154 may correspond to barrel 1724 of central portion 1720. In an exemplary embodiment, barrel cavity portion 2154 may correspond to a substantially cylindrical shaped central portion 1720. In other embodiments, barrel cavity portion 2154 may correspond to different shapes associated with a cleat member body, including but not limited to hexagonal, cylindrical, conical, circular, square, rectangular, trapezoidal, diamond, ovoid, as well as other regular or irregular and geometric or non-geometric shapes.

In an exemplary embodiment, barrel cavity portion 2154 may be formed by a corresponding void in a pre-formed outer shell portion 1710. In some embodiments, outer shell portion 1710 may be made using a mold that includes a mold portion corresponding to barrel cavity portion 2154, using any molding process described herein. With this arrangement, pre-formed outer shell portion 1710 may be set within through molding system 2140 to provide the void with a corresponding shape for forming the barrel cavity portion 2154 of the central portion of the two-piece cleat member.

In some embodiments, mold cavity 2152 may also include a fastener cavity portion 2156. In this embodiment, fastener cavity portion 2156 corresponds to a hole 812 within collar receptacle 810 that includes the fastener receiving portion. In an exemplary embodiment, fastener cavity portion 2156 may correspond to fastener element 1726 of central portion 1720. In some cases, fastener element 1726 of central portion 1720 may be provided to attach two-piece cleat member 1700 to collar receptacle 810. In particular, fastener element 1726 may be configured to releasably attach central portion 1720 to an outsole including collar receptacle 810. In an exemplary embodiment, fastener cavity portion 2156 may be configured to include a plurality of grooves configured to correspond to thread elements associated with fastener element 1726. With this arrangement, two-piece cleat member 1700 may be screwed into a corresponding fastener receiving portion in collar receptacle 810.

In some embodiments, through molding system 2140 may also include components configured to introduce material used for molding into mold cavity 2152. In an exemplary embodiment, through molding system 2140 may include an injection cavity 2150. In one embodiment, injection cavity 2150 may include an injection tip that protrudes from molding system 702. In some embodiments, injection cavity 1950 may be in fluid communication with mold cavity 2152 via an orifice 2158 and through hole 812 of collar receptacle 810. With this arrangement, orifice 2158 allows a liquid or viscous substance to pass through injection cavity 1950 and hole 812 into mold cavity 2152. In FIG. 31, only one injection cavity and orifice are shown, in other embodiments, however, through molding system 2140 and/or molding system 702 may include additional injection cavities with corresponding orifices.

Figure 32:
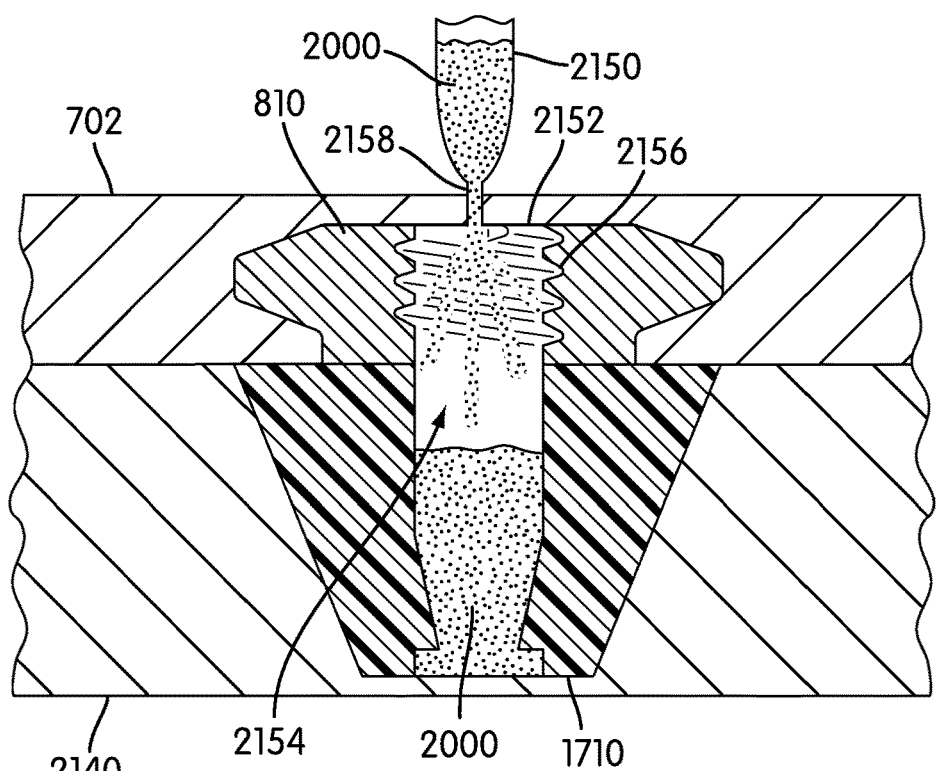
FIG. 32 is a schematic view of an alternate embodiment of a molding system for a central portion of a cleat member being filled with molding material.

Referring to FIG. 32, a schematic view of an exemplary embodiment of through molding system 2140 for making central portion 1720 of two-piece cleat member 1700 is illustrated being filled with molding material 2000. In an exemplary embodiment, molding material 2000 may be a thermoplastic polyurethane (TPU) material. In different embodiments, however, various types of molding material 2000 may be used to form central portion 1720 of two-piece cleat member 1700 using through molding system 2140. In some embodiments, molding material 2000 may include, but is not limited to, any one or more of the following materials: natural or synthetic rubber, hard foam, plastics, polymers, nylon, polyurethane, thermoplastic polyurethane (TPU), as well as any other deformable or rigid materials. However, it will be understood that any other materials could be used as molding material 2000. In addition, in some embodiments, central portion 1720 of two-piece cleat member 1700 may be produced using more than one molding material 2000. In an exemplary embodiment, molding material 2000 may be a compatible material with the molding material used to make outer shell portion 1710, including molding material 2200 above. With this arrangement, central portion 1720 and outer shell portion 1710 may be securely attached to one another.

As shown in FIG. 32, molding material 2000 may be introduced into through molding system 2140 through injection cavity 1950 and hole 812 of collar receptacle 810. In this embodiment, molding material 2000 passes through orifice 1958 and hole 812 into mold cavity 2152 and begins to fill barrel cavity portion 2154 defined by outer shell portion 1710 and fastener cavity portion 2156 defined by collar receptacle 810. In an exemplary embodiment, molding material 2000 substantially fills mold cavity 2152 to form central portion 1720.

In an exemplary embodiment, the order of molding specific components associated with the two-piece cleat assembly may be determined based on the characteristics of the molding materials used to form each component. In one embodiment, the two-piece cleat assembly is assembled as illustrated in FIGS. 31 and 32 due to choice of molding materials forming each component. In this embodiment, collar receptacle 810 may be formed from a first molding material that is highly durable and strong. The first molding material may be associated with a relatively high melting temperature necessary for injection into the mold. In this embodiment, outer shell portion 1710 of the two-piece cleat member may be formed from a second molding material that is soft and resilient. The second molding material may be associated with a relatively low melting temperature necessary for injection into the mold. Each of collar receptacle 810 and outer shell portion 1710 may be formed separately using any of the molding systems described above.

In an exemplary embodiment, central portion 1720 of two-piece cleat member may be configured so that it is non-compatible with collar receptacle 810, but compatible with outer shell portion 1710. In one embodiment, central portion 1720 may be made to be non-compatible with collar receptacle 810, but compatible with outer shell portion 1710 by choosing a third molding material for central portion 1720 that is associated with a melting temperature that is higher than the second molding material, but lower than the first molding material. With this arrangement, when the third molding material is injected into molding system 2140 containing a pre-formed collar receptacle 810 and a pre-formed outer shell portion 1710, the melting temperature of the third molding material will be sufficient to cause central portion 1720 and outer shell portion 1710 to bond by at least partially melting the second molding material, but will also be low enough not to melt the first molding material so that central portion 1720 does not bond with collar receptacle 810.

While the specific order of injection of the molding materials for each of the components has been described with reference to the melting temperatures associated with the respective molding materials used to form the components of the two-piece cleat assembly shown in FIGS. 31 and 32, it should be understood that the order of injecting the molding materials may be similarly chosen for any of the embodiments described herein. In various embodiments, the choice of molding materials and associated melting temperatures may determine the order of injection for forming each component. Further, in some embodiments, the choice of molding materials and associated temperatures may be determined based on desired compatibility of components, e.g., whether or not the materials are to be compatible or non-compatible. It should also be understood that increased hardness or durability of molding materials may be associated with higher melting temperatures. Accordingly, the principles described above with reference to FIGS. 31 and 32 may be applied to any of the embodiments herein.

FIGS. 33 through 36 illustrate an alternate embodiment of a collar receptacle. In some embodiments, a collar receptacle that may be associated with a cleat member to form a cleat assembly may be associated with different shapes. It should be understood that alternate embodiments of a collar receptacle may be made having different shapes using the same process as explained in regard to any molding system used to make collar receptacle 810, described above. In various embodiments, the shape and configuration of the mold cavity in a molding system may be changed to correspond to the desired shape of a collar receptacle.

Figure 33:
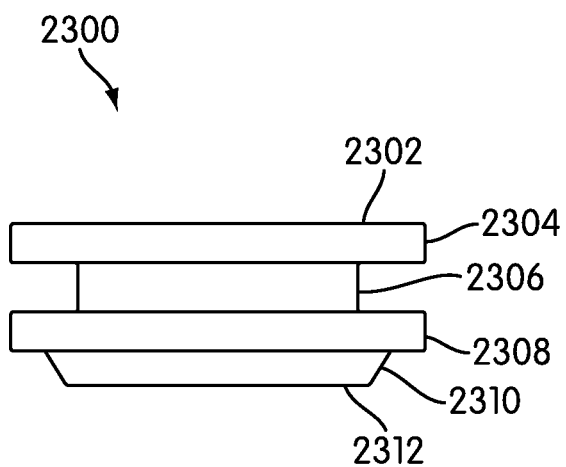
FIG. 33 is a side view of an alternate embodiment of a collar receptacle.

In an exemplary embodiment, a collar receptacle 2300 may be associated with a horseshoe-shaped cross-section. FIG. 33 illustrates a side view of an alternate embodiment of collar receptacle 2300 with a horseshoe-shaped cross-section. In this embodiment, collar receptacle 2300 may have an upper portion 2304 and a bottom portion 2308. In some embodiments, upper portion 2304 and bottom portion 2308 may have substantially similar diameters. In other embodiments, upper portion 2304 and bottom portion 2308 may have different diameters. In an exemplary embodiment, upper portion 2304 may include a top surface 2302 and bottom portion may include a lip element 2310 having a bottom surface 2312. In one embodiment, a spindle 2306 may be provided between upper portion 2304 and bottom portion 2308. In this embodiment, spindle 2306 may have a smaller diameter than upper portion 2304 and/or bottom portion 2308. With this arrangement, molding material may fill in the spaces between spindle 2306, upper portion 2304, and bottom portion 2308 to embed collar receptacle 2300 into a cleated plate member. Additionally, in some embodiments, lip element 2310 under bottom portion 2308 may provide protection to a cleat member attached to a cleated plate member.

Figure 34:
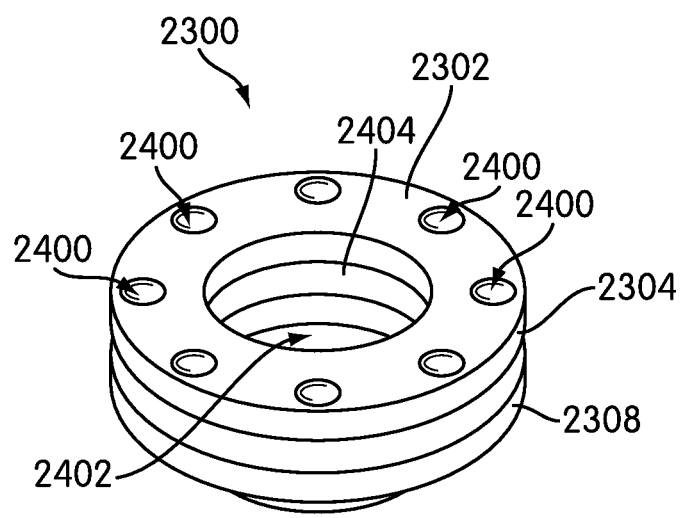
FIG. 34 is an isometric view of an alternate embodiment of a collar receptacle.

Referring now to FIG. 34, an isometric view of an alternate embodiment of collar receptacle 2300 is illustrated. In this embodiment, top surface 2302 of upper portion 2304 is shown. In some embodiments, collar receptacle 2300 may be provided with additional elements to assist with integrating collar receptacle 2300 into the cleated plate member during molding. In an exemplary embodiment, collar receptacle 2300 may be provided with a plurality of holes 2400 extending through top surface 2302 and upper portion 2304. In some embodiments, molding material may flow into holes 2400 within upper portion 2304 of collar receptacle 2300 during molding to further securely embed collar receptacle 2300 within the cleated plate member.

Figure 35:
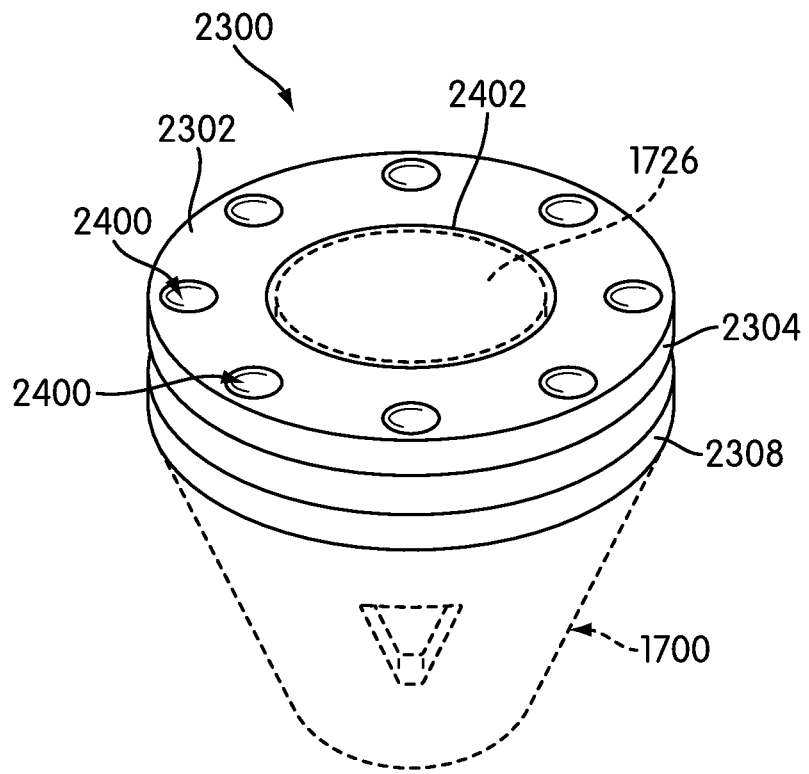
FIG. 35 is an isometric view of an alternate embodiment of a collar receptacle disposed on a two-piece cleat member.

Additionally, in some embodiments, collar receptacle 2300 may include a central hole 2402 that may be provided with a fastener receiving portion 2404 to receive a thread of a corresponding fastener element of a cleat member, as described above in regard to previous embodiments. Referring now to FIG. 35, an isometric view of collar receptacle 2300 is illustrated disposed on two-piece cleat member 1700. As explained above, it should be understood, however, that collar receptacle 2300 and two-piece cleat member 1700 may be used with any type of corresponding cleat members and collar receptacles to form cleat assemblies to be embedded within the cleated plate member. In this embodiment, fastener element 1726 of two-piece cleat member 1700 may extend through central hole 2402 of collar receptacle 2300. In an exemplary embodiment, the thread of fastener element 1726 corresponds with fastener receiving portion 2404 of collar receptacle 2300 formed using the molding process described above. With this arrangement, two-piece cleat member 1700 and collar receptacle 2300 may be releasably attached.

Figure 36:
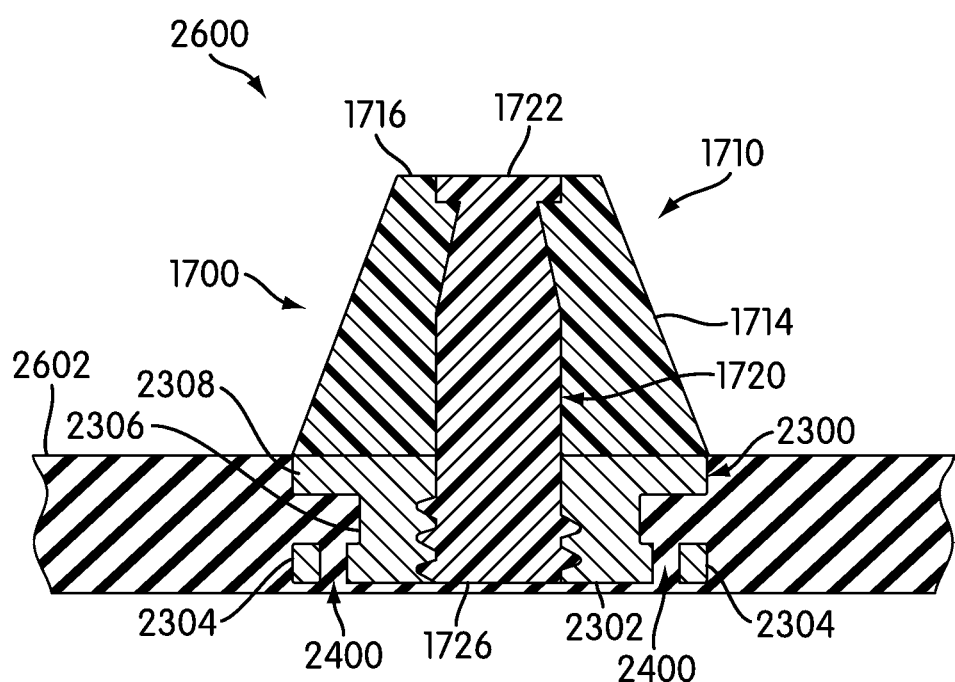
FIG. 36 is a cross-sectional view of an alternate embodiment of a cleat assembly set within a cleated plate member.

FIG. 36 illustrates a cross-sectional view of an alternate embodiment of a cleat assembly 2600 embedded within a cleated plate member 2602. In an exemplary embodiment, cleat assembly 2600 may include two-piece cleat member 1700. In this embodiment, two-piece cleat member 1700 may comprise outer shell portion 1710 and central portion 1720, described above. In one embodiment, cleat assembly 2600 may also include collar receptacle 2300 embedded within cleated plate member 2602. In some embodiments, collar assembly 2600, including collar receptacle 2300 may be embedded within cleated plate member 2602 using molding system 1100 and the associated molding process, described above. In this embodiment, molding material forming the plate body substantially surrounds collar receptacle 2300 within cleated plate member 2602. Additionally, in some embodiments, molding material may be integrated between holes 2400 in upper portion 2304 of collar receptacle 2300 to further securely embed collar receptacle 2300 within cleated plate member 2602. With this arrangement, two-piece cleat member 1700 may be releasably attached to cleated plate member 2602 by engaging fastener element 1726 with corresponding fastener receiving portion of collar receptacle 2300. In an exemplary embodiment, two-piece cleat member 1700 may be tightly screwed into collar receptacle 2300 within plate body of cleated plate member 2602.

Additionally, this releasable attachment of two-piece cleat member 1700 to cleated plate member 2602 may allow for replacement and/or customization of cleat members. For example, cleat members may be removed to replace worn or broken cleat members and/or different types of cleat members may be used for various playing surfaces and/or conditions.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method of forming a cleat member, the method comprising:
   positioning a collar receptacle in a first cavity of a first mold, the collar receptacle having a bore including a first series of threads;
   positioning a second mold adjacent to the first mold, the second mold including a second cavity in fluid communication with the bore of the collar receptacle; and
   injecting a first molding material through the bore of the collar receptacle, into the second cavity, and into the bore of the collar receptacle to form a central portion of the cleat member.

2. The method of claim 1, wherein injecting a first molding material through the bore of the collar receptacle includes substantially filling the bore of the collar receptacle with the first molding material.

3. The method of claim 2, wherein filling the bore of the collar receptacle with the first molding material includes providing the central portion with a second series of threads.

4. The method of claim 3, wherein providing the central portion with a second series of threads includes providing a second series of threads that are complimentary to the first series of threads.

5. The method of claim 3, wherein providing the central portion with a second series of threads includes using the first series of threads to shape the first molding material into the second series of threads.

6. The method of claim 1, wherein injecting a first molding material through the bore of the collar receptacle includes injecting a different material than a material of the collar receptacle.

7. The method of claim 1, wherein injecting a first molding material through the bore of the collar receptacle includes injecting a material that is non-compatible with a material of the collar receptacle.

8. The method of claim 1, further comprising solidifying the first molding material, subsequently removing the central portion from the second mold, and positioning the central portion within a third cavity of a third mold.

9. The method of claim 8, further comprising filling the third cavity with a second molding material, the second molding material surrounding the central portion to form a body shell portion of the cleat member.

10. The method of claim 9, wherein filling the third cavity with a second molding material includes filling the third cavity with a clear or semi-transparent molding material, the central portion being visible through the second molding material after solidification of the second molding material.

11. A method of forming a cleat member, the method comprising:
    positioning a collar receptacle in a first cavity of a first mold, the collar receptacle having a bore including a first series of threads;
    positioning a second mold adjacent to the first mold, the second mold including a second cavity in fluid communication with the bore of the collar receptacle; and
    injecting a first molding material into the bore of the collar receptacle and into the second cavity to form a central portion of the cleat member having a second series of threads formed by the first series of threads of the collar receptacle.

12. The method of claim 11, wherein injecting a first molding material into the bore of the collar receptacle and into the second cavity includes substantially filling the bore of the collar receptacle with the first molding material.

13. The method of claim 11, wherein injecting a first molding material into the bore of the collar receptacle and into the second cavity includes dispensing the first molding material from a port, the collar receptacle being disposed between the port and the second mold.

14. The method of claim 13, wherein dispensing the first molding material from a port includes dispensing the first molding material from a port formed into the first mold.

15. The method of claim 11, wherein injecting a first molding material into the second cavity includes injecting the first molding material through the bore and into the second cavity.

16. The method of claim 11, wherein injecting a first molding material into the bore of the collar receptacle and into the second cavity includes injecting a different material than a material of the collar receptacle.

17. The method of claim 11, wherein injecting a first molding material into the bore of the collar receptacle and into the second cavity includes injecting a material that is non-compatible with a material of the collar receptacle.

18. The method of claim 11, further comprising solidifying the first molding material, subsequently removing the central portion from the second mold, and positioning the central portion within a third cavity of a third mold.

19. The method of claim 18, further comprising filling the third cavity with a second molding material, the second molding material surrounding the central portion to form a body shell portion of the cleat member.

20. The method of claim 19, wherein filling the third cavity with a second molding material includes filling the third cavity with a clear or semi-transparent molding material, the central portion being visible through the second molding material after solidification of the second molding material.

* * * * *